US011554380B2

(12) United States Patent
Rubow et al.

(10) Patent No.: US 11,554,380 B2
(45) Date of Patent: Jan. 17, 2023

(54) TWO-PHASE SEPARATOR DEVICES INCORPORATING INERTIAL SEPARATION AND POROUS MEDIA EXTRACTION

(71) Applicant: Mott Corporation, Farmington, CT (US)

(72) Inventors: Kenneth L. Rubow, Avon, CT (US); James K. Steele, Rockfall, CT (US); Allen L. Beaune, Norfolk, CT (US); Aravind Mohanram, Avon, CT (US)

(73) Assignee: MOTT CORPORATION, Farmington, CT (US)

( * ) Notice: Subject to any disclaimer, the term of this patent is extended or adjusted under 35 U.S.C. 154(b) by 0 days.

(21) Appl. No.: 17/084,975

(22) Filed: Oct. 30, 2020

(65) Prior Publication Data
US 2021/0129160 A1 May 6, 2021

Related U.S. Application Data

(60) Provisional application No. 63/010,299, filed on Apr. 15, 2020, provisional application No. 62/928,912, filed on Oct. 31, 2019.

(51) Int. Cl.
*B01D 50/00* (2022.01)
*B04C 9/00* (2006.01)
(Continued)

(52) U.S. Cl.
CPC ............... *B04C 9/00* (2013.01); *B01D 45/16* (2013.01); *B01D 46/543* (2013.01); *B01D 50/20* (2022.01);
(Continued)

(58) Field of Classification Search
CPC ....... B04C 9/00; B04C 3/00; B04C 2009/004; B04C 2003/006; B01D 45/16;
(Continued)

(56) References Cited

U.S. PATENT DOCUMENTS 1,809,375 A * 6/1931 Chase .................. F02M 33/06
48/189.2
1,854,010 A * 4/1932 Woodford .............. B01D 46/24
55/334
(Continued)

OTHER PUBLICATIONS

International Search Report for International Application No. PCT/US2020/058217; International Filing Date Oct. 30, 2020; dated Jan. 19, 2021; 3 pages.
(Continued)

*Primary Examiner* — Dung H Bui
(74) *Attorney, Agent, or Firm* — Cantor Colburn LLP

(57) ABSTRACT

Disclosed herein are phase separator devices, and related methods of fabrication and use. The disclosure provides improved phase separator devices for phase separation of input feeds, and systems/methods for utilizing and fabricating the devices. The disclosure provides phase separator devices utilizing inertial separation and porous media extraction for the phase separation of two-phase input feeds (e.g., to separate an input feed of a two-phase mixture to a first phase output (e.g., to a liquid output flow) and to a second phase output (e.g., to a gas output flow)). The device can separate a mixed fluid flow of both liquid and gases. The liquid and gas can include liquid and vapor phases of the same chemical/constituent (e.g., ammonia), or may include liquid and gases of two different constituents (e.g., liquid water and air). The phase separator devices can be utilized at standard gravity to micro-gravity to zero gravity environments.

18 Claims, 21 Drawing Sheets

(51) Int. Cl.
*B04C 3/00* (2006.01)
*B01D 45/16* (2006.01)
*B01D 46/54* (2006.01)
*B01D 50/20* (2022.01)

(52) U.S. Cl.
CPC .......... *B04C 3/00* (2013.01); *B04C 2003/006* (2013.01); *B04C 2009/004* (2013.01)

(58) Field of Classification Search
CPC ............... B01D 50/002; B01D 46/543; B01D 2311/06; B01D 19/0057; B01D 2311/2619; B01D 2311/2692; B01D 46/0031; B01D 45/12
See application file for complete search history.

(56) References Cited

U.S. PATENT DOCUMENTS

| | | | | |
|---|---|---|---|---|
| 2,068,048 | A * | 1/1937 | Renard | B01D 46/2403 55/318 |
| 2,402,845 | A * | 6/1946 | Rodman | B04C 7/00 55/345 |
| 2,711,226 | A * | 6/1955 | Davis, Jr. | B03C 3/15 96/61 |
| 2,720,278 | A * | 10/1955 | Wiley | B01D 46/0031 55/318 |
| 2,894,600 | A * | 7/1959 | Veres | B01D 46/2407 55/335 |
| 2,936,043 | A * | 5/1960 | Armstrong | B04C 5/13 55/416 |
| 3,078,650 | A * | 2/1963 | Anderson | B01D 46/2411 55/337 |
| 3,269,097 | A * | 8/1966 | German | B01D 45/06 55/337 |
| 3,378,993 | A * | 4/1968 | Veres | B01D 45/08 96/409 |
| 3,386,588 | A * | 6/1968 | Ades | B04C 5/28 210/512.2 |
| 3,443,368 | A * | 5/1969 | Wilson | B04C 5/085 55/435 |
| 3,448,563 | A * | 6/1969 | Sobeck | G21C 15/16 55/347 |
| 3,504,804 | A * | 4/1970 | Arnold | B04C 5/103 210/512.1 |
| 3,507,098 | A * | 4/1970 | Veres | F22B 37/265 96/409 |
| 3,845,840 | A * | 11/1974 | Thrasher | F01N 3/00 181/230 |
| 4,162,905 | A * | 7/1979 | Schuler | B01D 45/16 55/337 |
| 4,217,118 | A * | 8/1980 | Kopf | B01D 46/2411 55/330 |
| 4,233,160 | A * | 11/1980 | Macierewicz | B04C 5/06 209/728 |
| 4,311,494 | A * | 1/1982 | Conner | B01D 45/16 55/394 |
| 4,409,005 | A * | 10/1983 | McKendrick | B01D 46/0031 137/203 |
| 4,420,314 | A * | 12/1983 | Barron, Jr. | B04C 5/06 55/436 |
| 4,475,932 | A | 10/1984 | Hull et al. | |
| 4,537,608 | A * | 8/1985 | Koslow | B01D 46/48 55/337 |
| 4,668,256 | A * | 5/1987 | Billiet | B01D 45/08 55/337 |
| 4,966,703 | A * | 10/1990 | Kalnins | B01D 17/0217 210/512.1 |
| 5,271,245 | A * | 12/1993 | Westermeyer | F25B 43/02 62/470 |
| 5,494,501 | A * | 2/1996 | Anspach | B01D 45/14 55/330 |
| 5,575,615 | A * | 11/1996 | Mohn | F04D 1/00 415/74 |
| 5,746,791 | A * | 5/1998 | Wang | B01D 53/265 55/337 |
| 6,932,849 | B2 * | 8/2005 | Sheidler | B01D 45/16 55/347 |
| 7,001,448 | B1 * | 2/2006 | West | B01D 45/16 55/413 |
| 7,442,220 | B2 * | 10/2008 | Pearson | B01D 46/0012 210/444 |
| 7,537,624 | B2 * | 5/2009 | Jachmann | B01D 45/16 55/337 |
| 8,075,656 | B2 * | 12/2011 | Lane | B01D 45/06 55/426 |
| 9,151,449 | B2 * | 10/2015 | Sakai | B01D 35/306 |
| 9,272,235 | B2 * | 3/2016 | Yamase | B01D 46/2411 |
| 9,314,726 | B2 * | 4/2016 | Yamase | B01D 46/0004 |
| 9,649,576 | B2 * | 5/2017 | Bozic | B01D 15/40 |
| 2004/0237778 | A1 | 12/2004 | Charlat | |
| 2005/0060970 | A1 * | 3/2005 | Polderman | B01D 45/08 55/320 |
| 2007/0137156 | A1 * | 6/2007 | da Costa | B01D 46/0086 55/486 |
| 2010/0275561 | A1 * | 11/2010 | Lundquist | B04C 3/00 55/456 |
| 2011/0016835 | A1 | 1/2011 | Fredheim et al. | |
| 2011/0113738 | A1 * | 5/2011 | Zachos | B01D 45/08 55/320 |
| 2013/0327002 | A1 * | 12/2013 | Ackermann | B04C 3/00 55/327 |
| 2014/0059800 | A1 * | 3/2014 | Bassett | A47L 9/106 55/315 |
| 2014/0083064 | A1 * | 3/2014 | Sakai | F04B 39/16 55/449 |
| 2015/0217211 | A1 | 8/2015 | Swanborn | |
| 2017/0321936 | A1 | 11/2017 | Cho | |
| 2018/0036746 | A1 * | 2/2018 | Antomon | B04C 5/08 |
| 2018/0339920 | A1 | 11/2018 | Culler | |

OTHER PUBLICATIONS

Written Opinion for International Application No. PCT/US2020/058217; International Filing Date Oct. 30, 2020; dated Jan. 19, 2021; 11 pages.

* cited by examiner

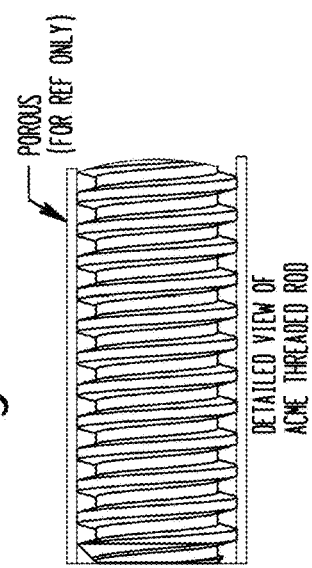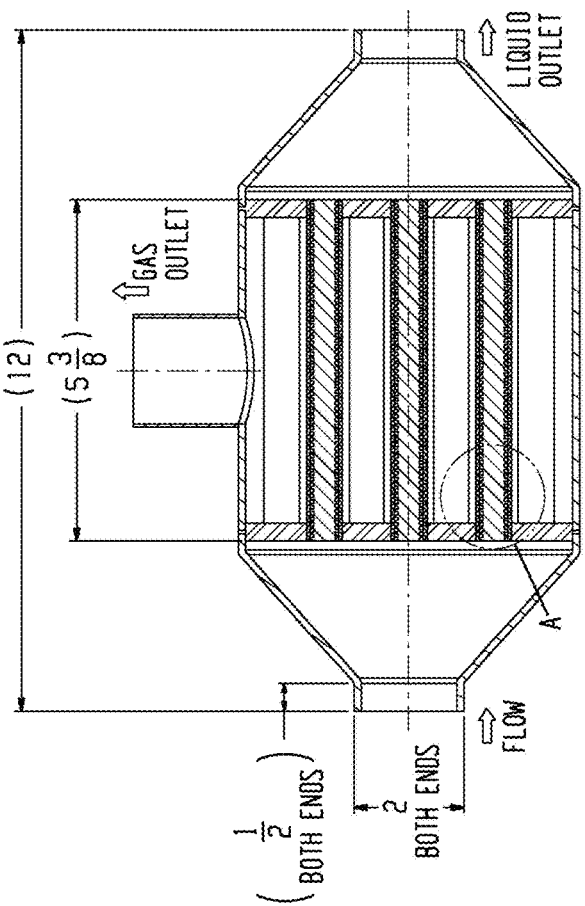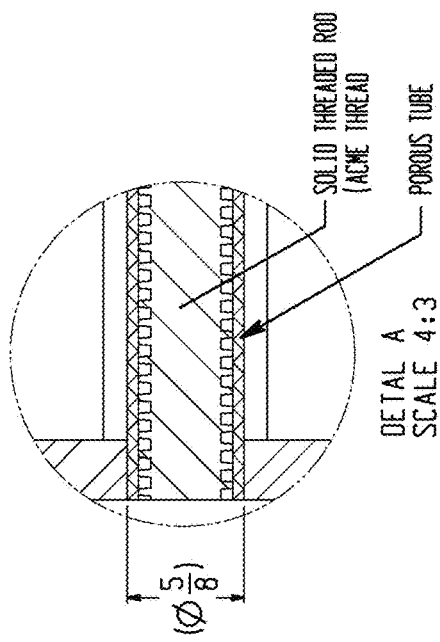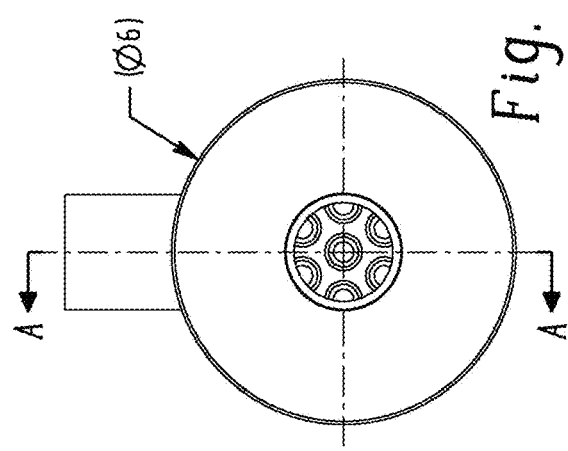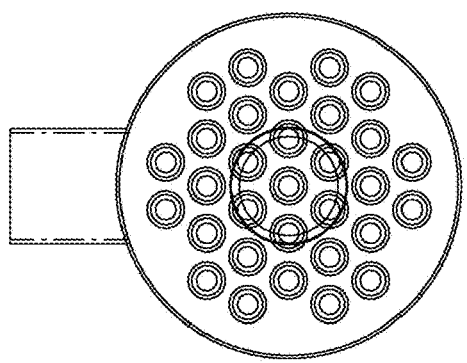

TWO-PHASE SEPARATOR DEVICES INCORPORATING INERTIAL SEPARATION AND POROUS MEDIA EXTRACTION

CROSS-REFERENCE TO RELATED APPLICATIONS

The present application claims priority benefit to: (i) a provisional application which was filed on Oct. 31, 2019, and assigned Ser. No. 62/928,912; and (ii) a provisional application which was filed on Apr. 15, 2020, and assigned Ser. No. 63/010,299. The entire contents of both of the foregoing provisional applications are incorporated herein by reference.

FIELD OF THE DISCLOSURE

The present disclosure relates to phase separator devices for phase separation of input feeds and systems/methods for utilizing and fabricating the phase separator devices and, more particularly, to phase separator devices utilizing inertial separation and porous media extraction for the phase separation of two-phase input feeds (e.g., to separate an input feed of a two-phase mixture to a first phase output (e.g., to a liquid output flow) and to a second phase output (e.g., to a gas output flow)).

BACKGROUND OF THE DISCLOSURE

In general, there are numerous applications for structures and assemblies for phase separation of input feeds.

An interest exists for improved systems and methods for phase separation of input feeds.

These and other inefficiencies and opportunities for improvement are addressed and/or overcome by the systems, methods and devices of the present disclosure.

BRIEF SUMMARY OF THE DISCLOSURE

The present disclosure provides advantageous phase separator devices for phase separation of input feeds, and improved systems/methods for utilizing and fabricating the phase separator devices. More particularly, the present disclosure provides phase separator devices utilizing inertial separation and porous media extraction for the phase separation of two-phase input feeds (e.g., to separate an input feed of a two-phase mixture to a first phase output (e.g., to a liquid output flow) and to a second phase output (e.g., to a gas output flow)). The phase separator devices can be utilized at standard gravity to micro-gravity to zero gravity environments.

The present disclosure provides for a phase separator device including a housing that extends from a first end to a second end, the housing having one or more first openings for the exit of a first phase output and one or more second openings for the exit of a second phase output; one or more guide vanes disposed in the housing; wherein the housing includes an axial flow cyclonic separation section and a porous media section; and wherein the axial flow cyclonic separation section and the porous media section are configured and dimensioned to separate an input feed introduced to the housing into the first phase output and the second phase output.

The present disclosure provides for a phase separator device including one or more extractor elements disposed in a housing, the housing having an inlet for an input feed and a first outlet for a first phase output and a second outlet for a second phase output; wherein each extractor element includes a threaded rod housed in a porous media tube; wherein the one or more extractor elements are configured and dimensioned to separate the input feed introduced to the inlet into the first phase output and the second phase output.

The present disclosure provides for a phase separator device including a housing that extends from a first end to a second end, the housing having one or more first openings for the exit of a first phase output and one or more second openings for the exit of a second phase output; one or more guide vanes disposed in the housing; wherein the housing includes a reverse flow cyclonic separation section and a porous media section; and wherein the reverse flow cyclonic separation section and the porous media section are configured and dimensioned to separate an input feed introduced to the housing into the first phase output and the second phase output.

The above described and other features are exemplified by the following figures and detailed description.

Any combination or permutation of embodiments is envisioned. Additional advantageous features, functions and applications of the disclosed systems, methods and devices of the present disclosure will be apparent from the description which follows, particularly when read in conjunction with the appended figures. All references listed in this disclosure are hereby incorporated by reference in their entireties.

BRIEF DESCRIPTION OF THE DRAWINGS

The following figures are exemplary embodiments wherein the like elements are numbered alike.

Features and aspects of embodiments are described below with reference to the accompanying drawings, in which elements are not necessarily depicted to scale.

Figure 1:
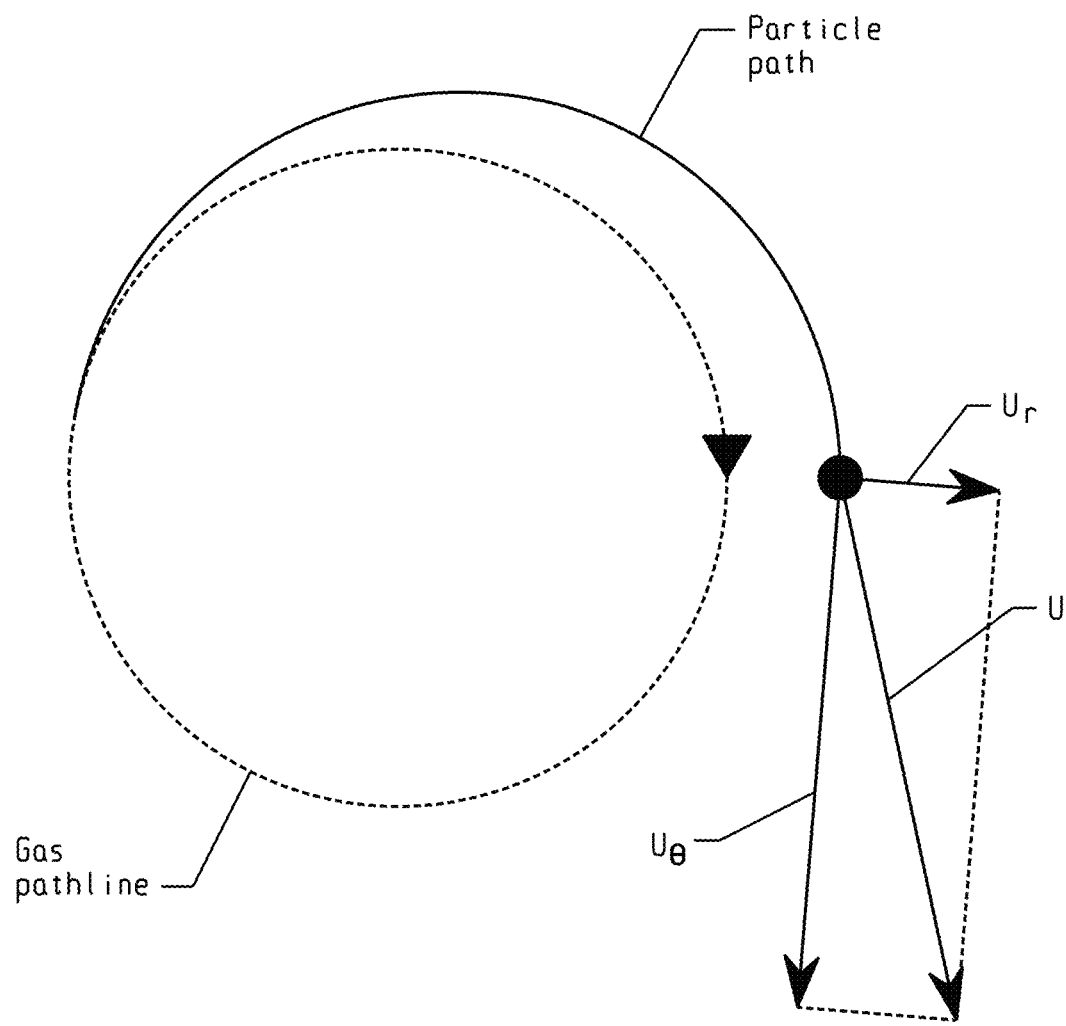

Exemplary embodiments of the present disclosure are further described with reference to the appended figures. It is to be noted that the various features, steps, and combinations of features/steps described below and illustrated in the figures can be arranged and organized differently to result in embodiments which are still within the scope of the present disclosure. To assist those of ordinary skill in the art in making and using the disclosed systems, methods and devices, reference is made to the appended figures, wherein:

FIG. 1 shows inertial separation for cyclonic separation of the denser phase from the lighter gas phase.

Figure 2:
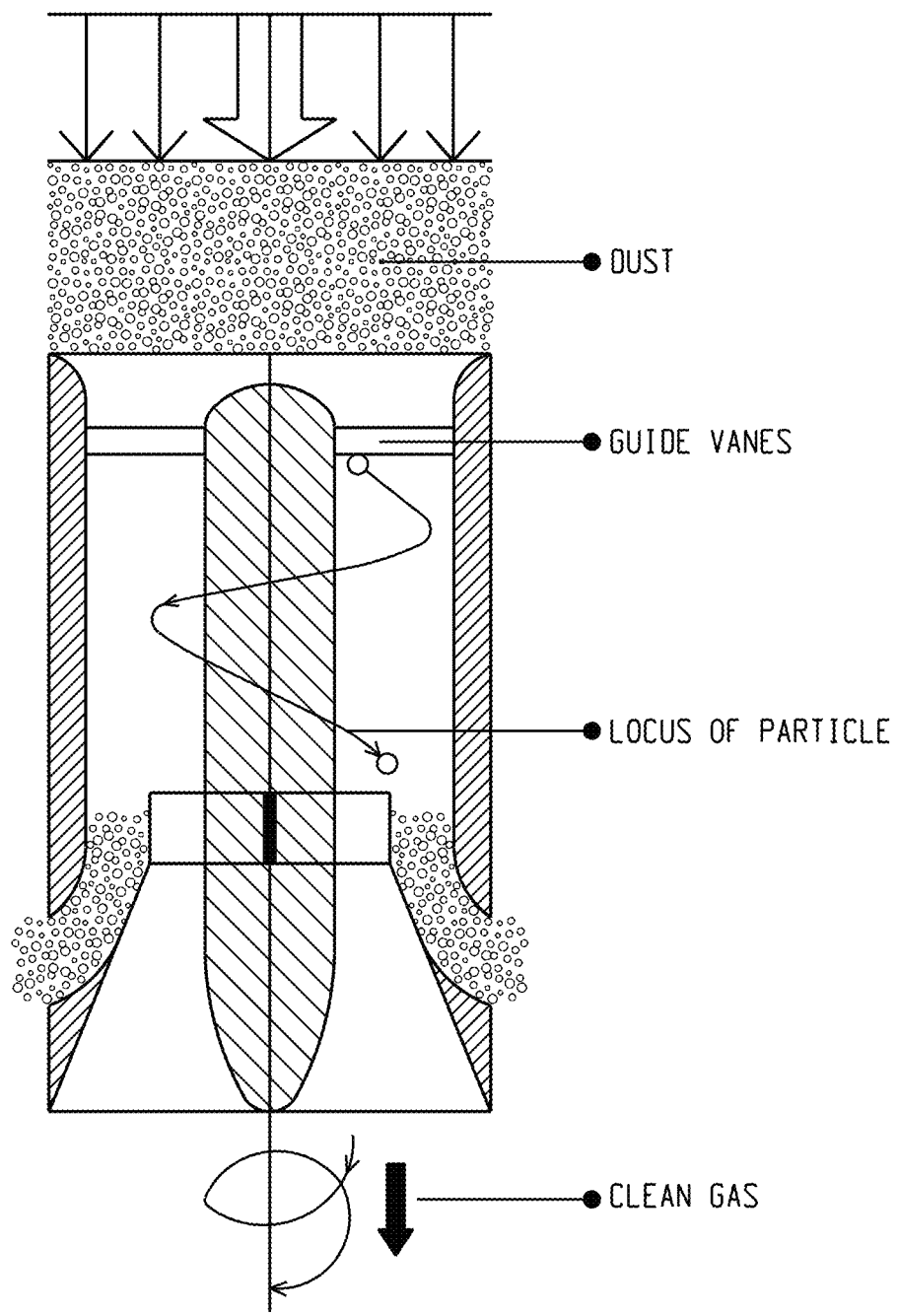

FIG. 2 is an illustration of an axial flow separator.

Figure 3:
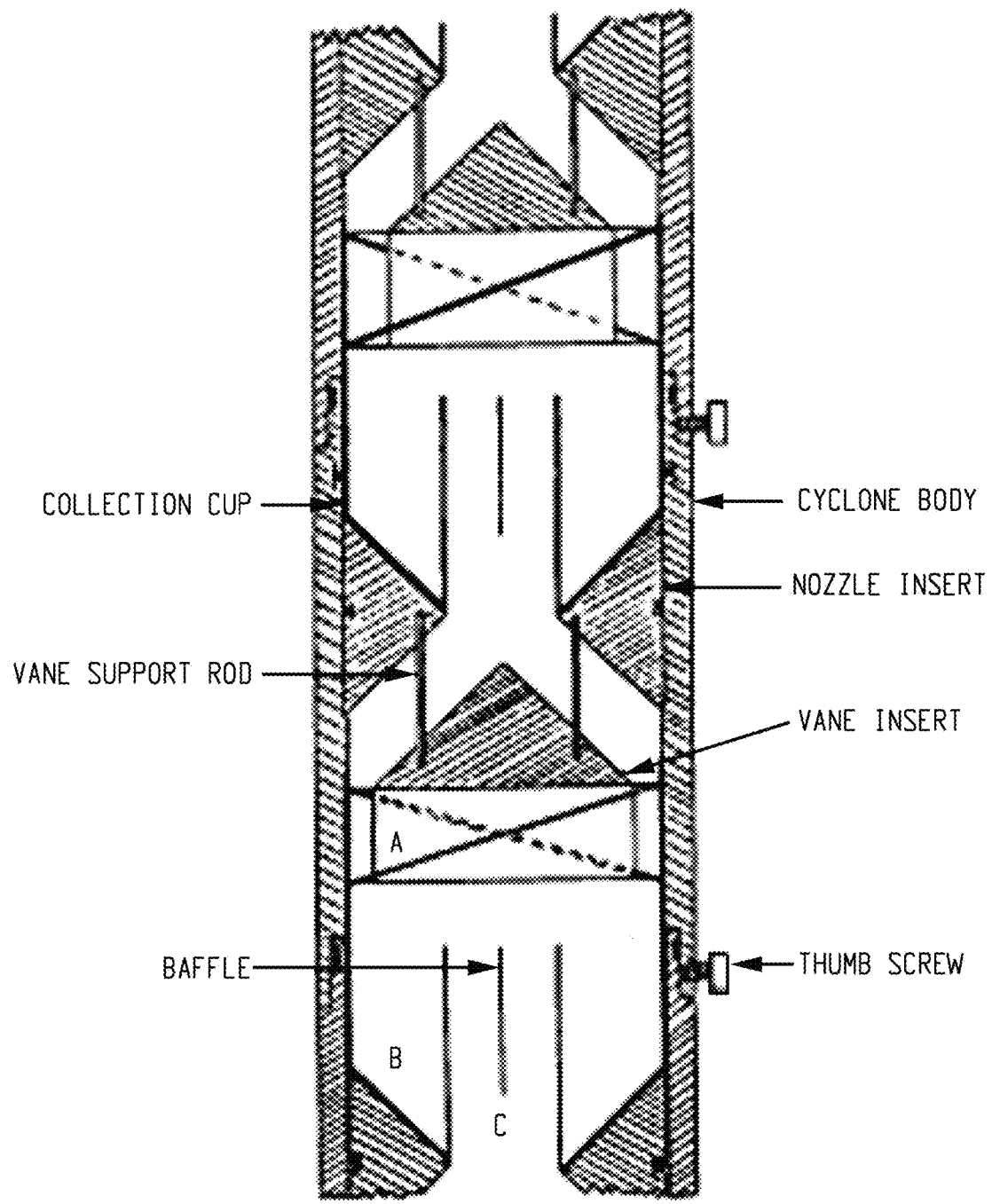

FIG. 3 is an illustration of one stage in a five-stage cascade axial flow cyclone.

Figure 4:
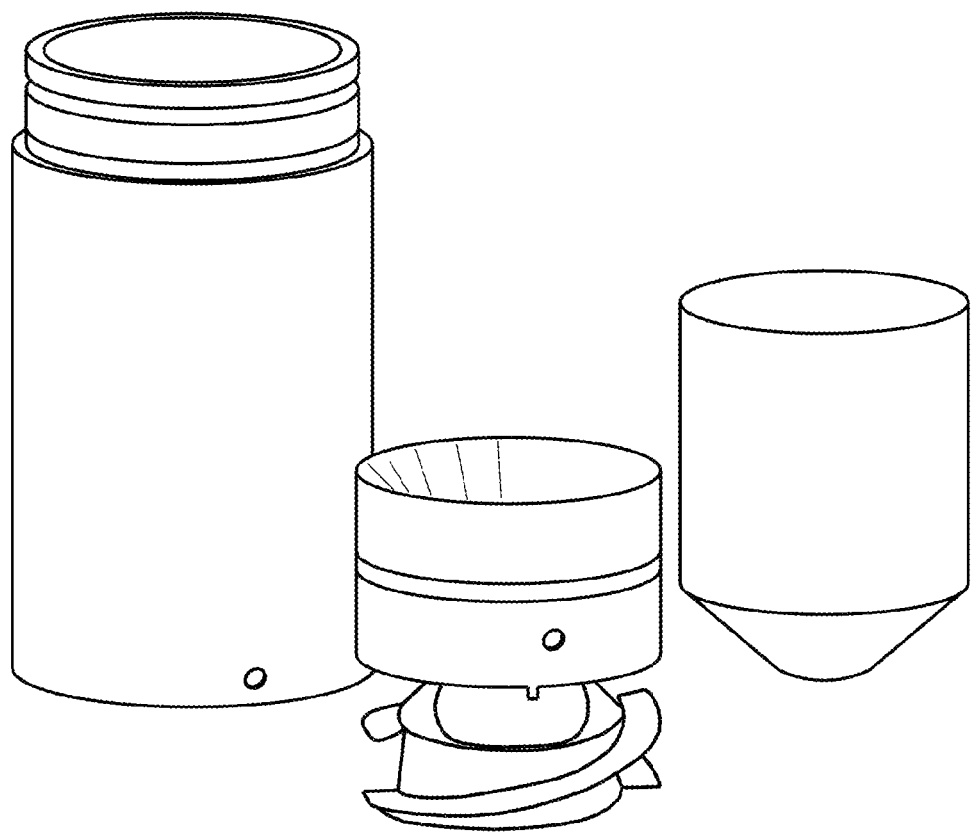

FIG. 4 is an image of components for one stage in a five-stage cascade axial flow cyclone.

Figure 5:
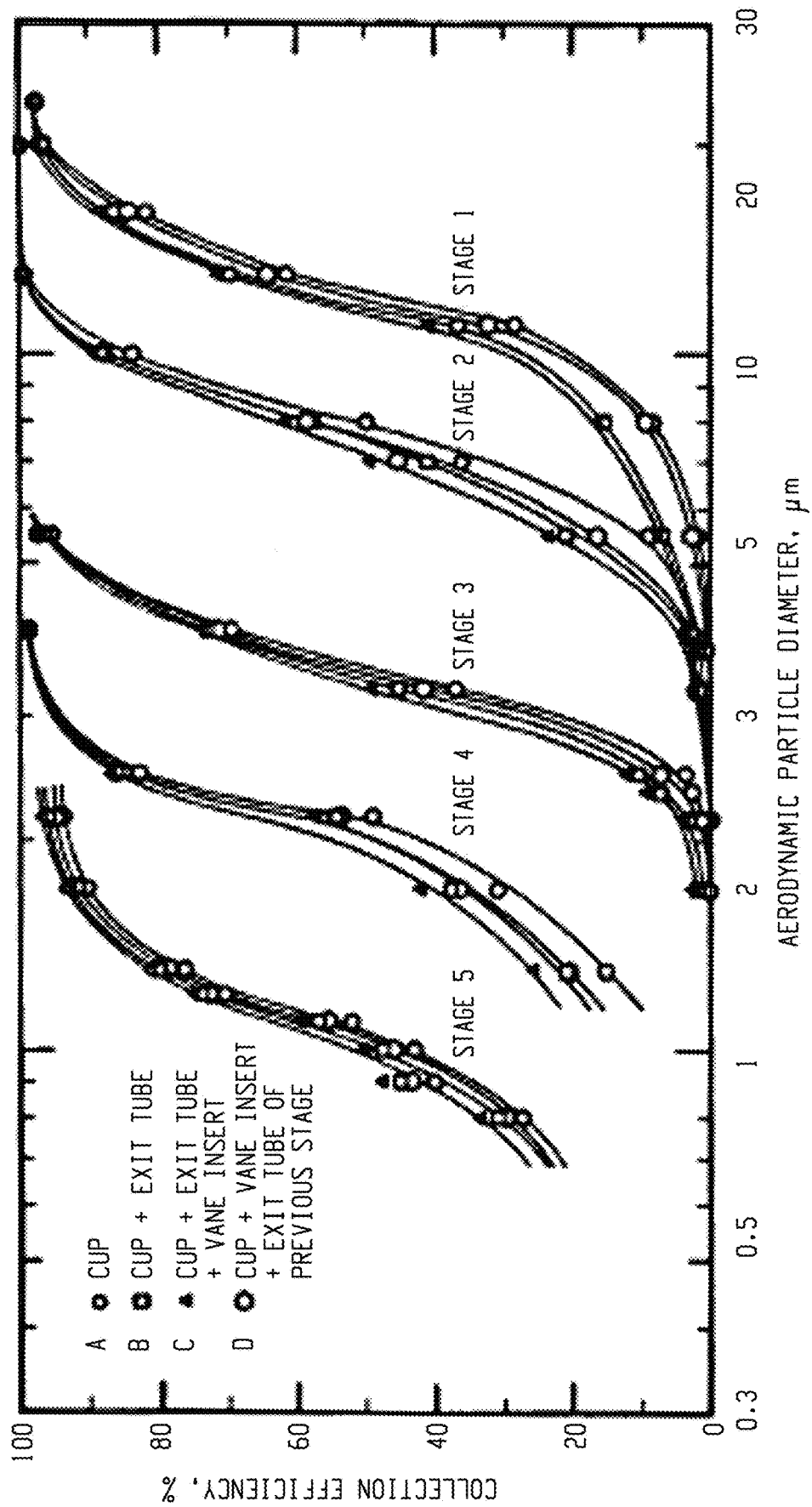

FIG. 5 shows particle separation (collection efficiency) as a function of particle size for each stage of the five-stage cascade axial flow cyclone.

Figure 6:
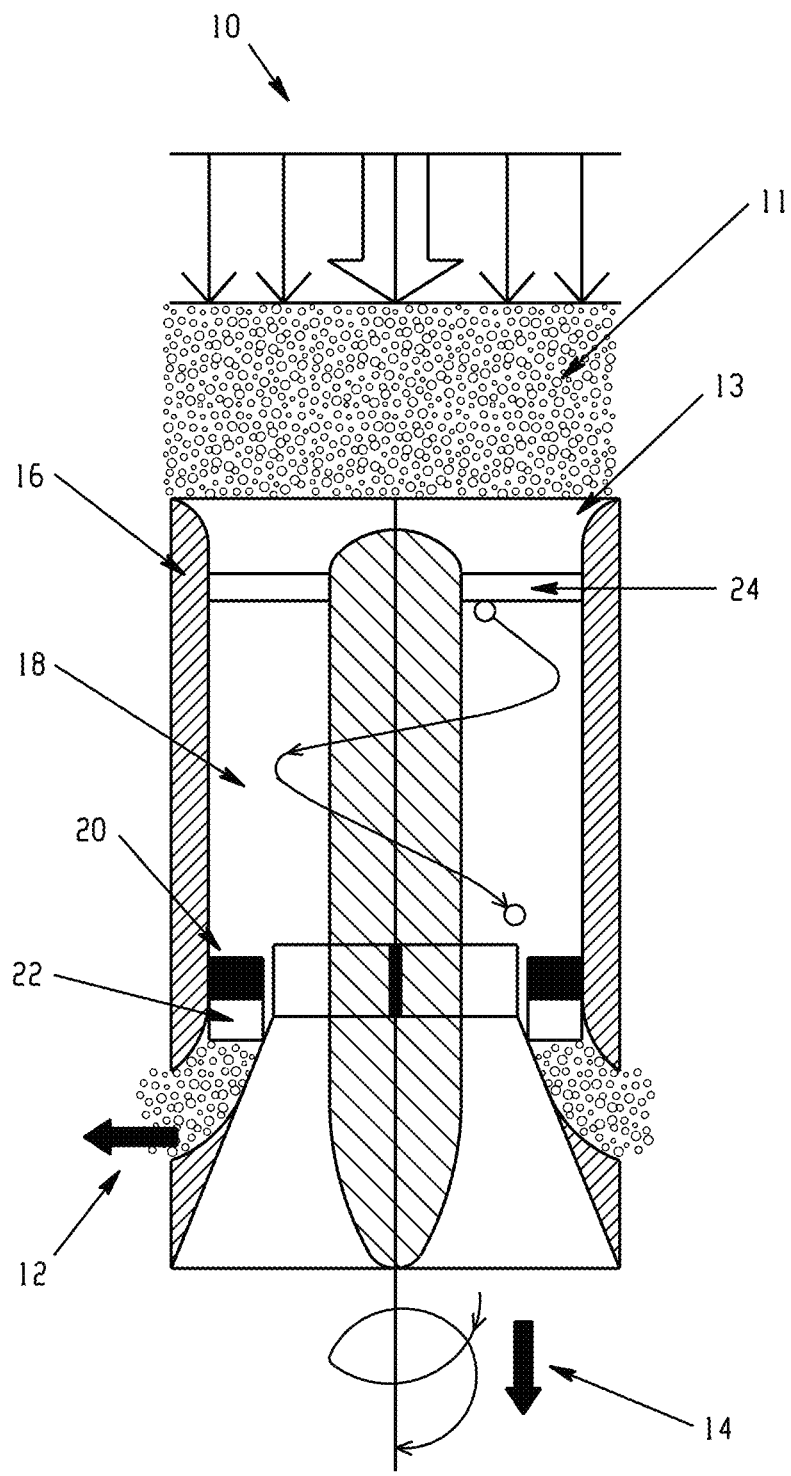

FIG. 6 is a depiction of an exemplary phase separator device (e.g., two-phase axial flow cyclone separator device, with an axial inlet for the input feed) according to the present disclosure.

Figure 7:
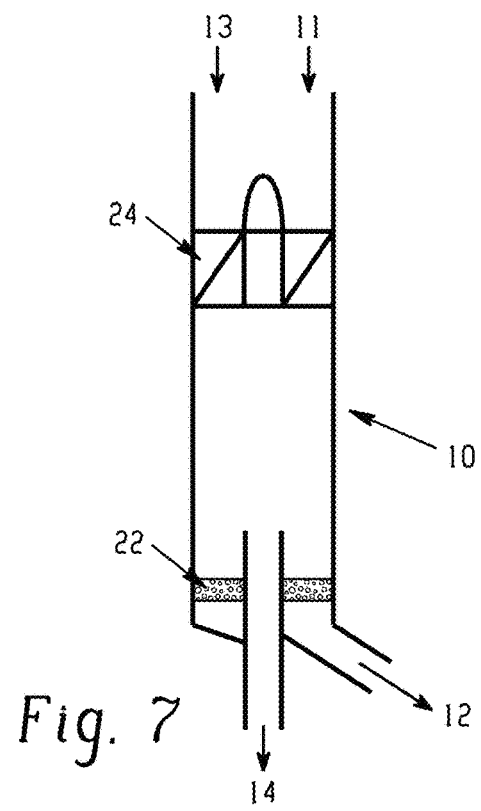

FIG. 7 is another depiction of the phase separator device of FIG. 6.

Figure 8:
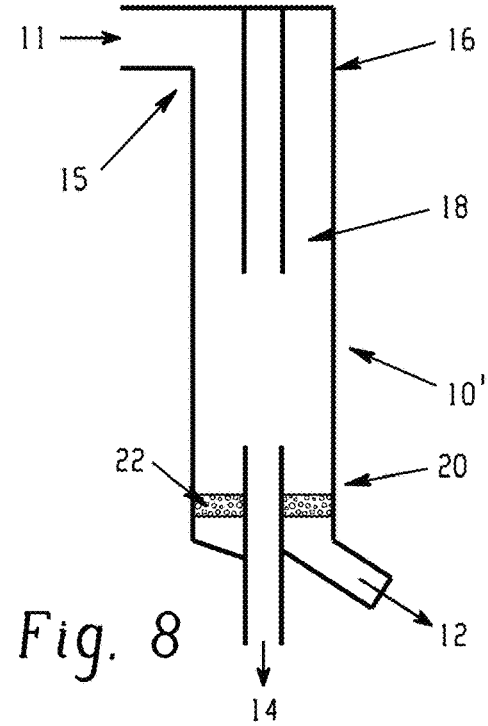

FIG. 8 is a depiction of another exemplary phase separator device (e.g., two-phase axial flow cyclone separator device, with a tangential inlet for the input feed) according to the present disclosure.

Figure 9:
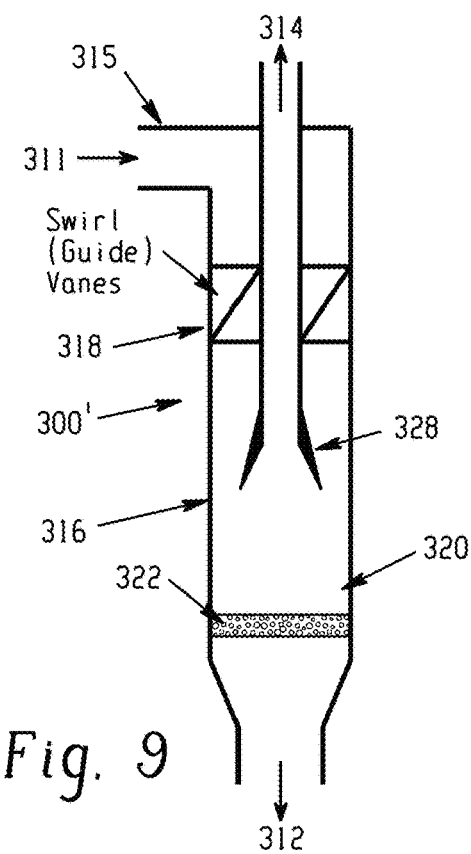

FIG. 9 is a depiction of another exemplary phase separator device (e.g., two-phase reverse flow cyclone separator device, with a tangential inlet for the input feed) according to the present disclosure.

Figure 10:
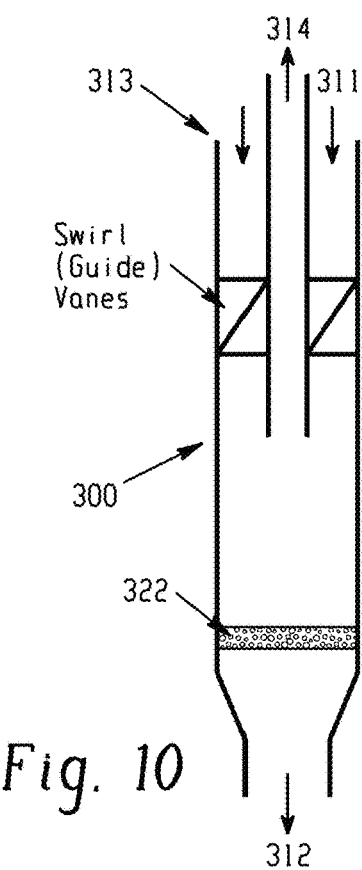

FIG. 10 is a depiction of another exemplary phase separator device (e.g., two-phase reverse flow cyclone separator device, with an axial inlet for the input feed) according to the present disclosure.

Figure 11:
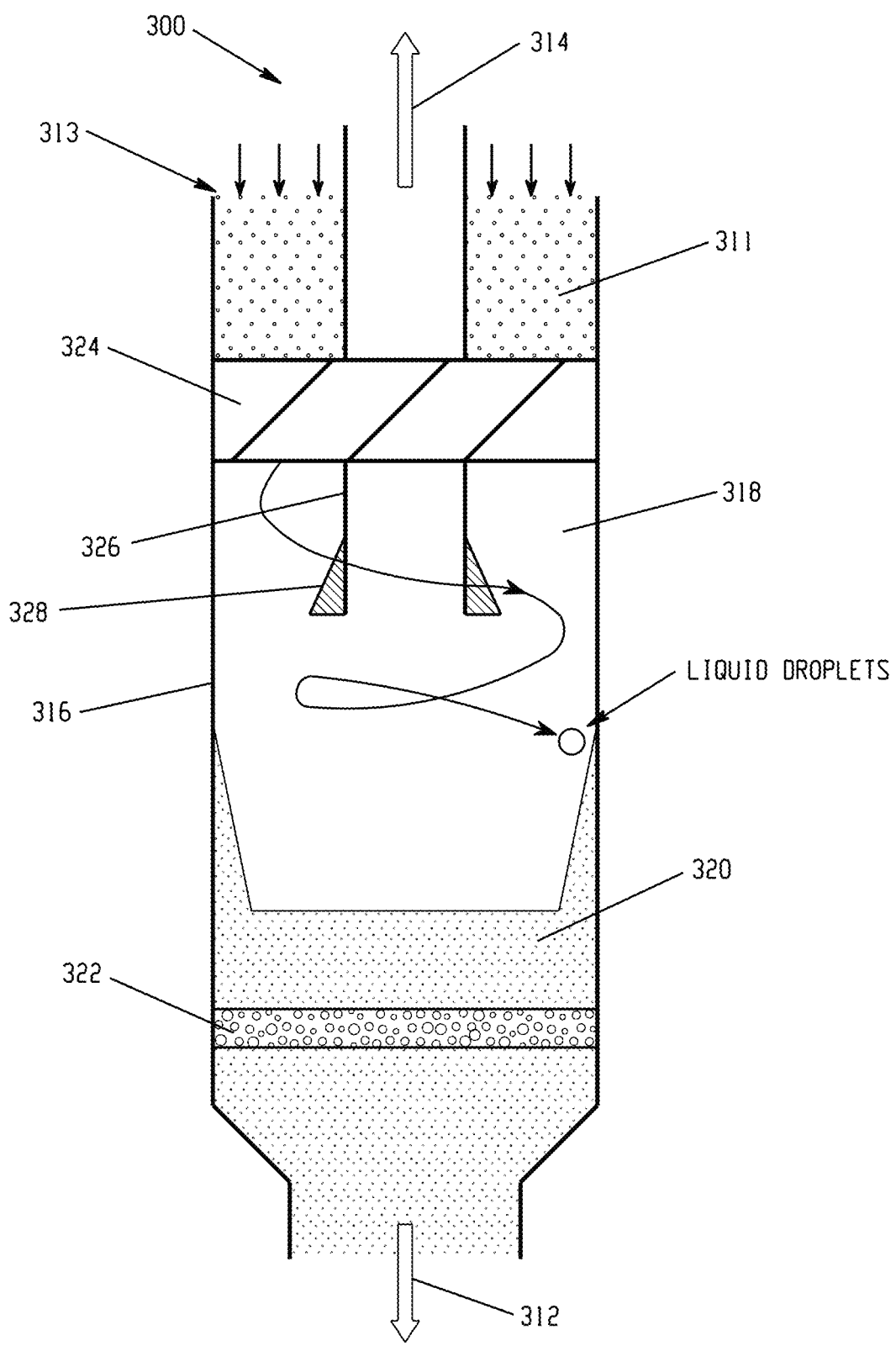

FIG. 11 is another depiction of the phase separator device of FIG. 10.

Figure 12:
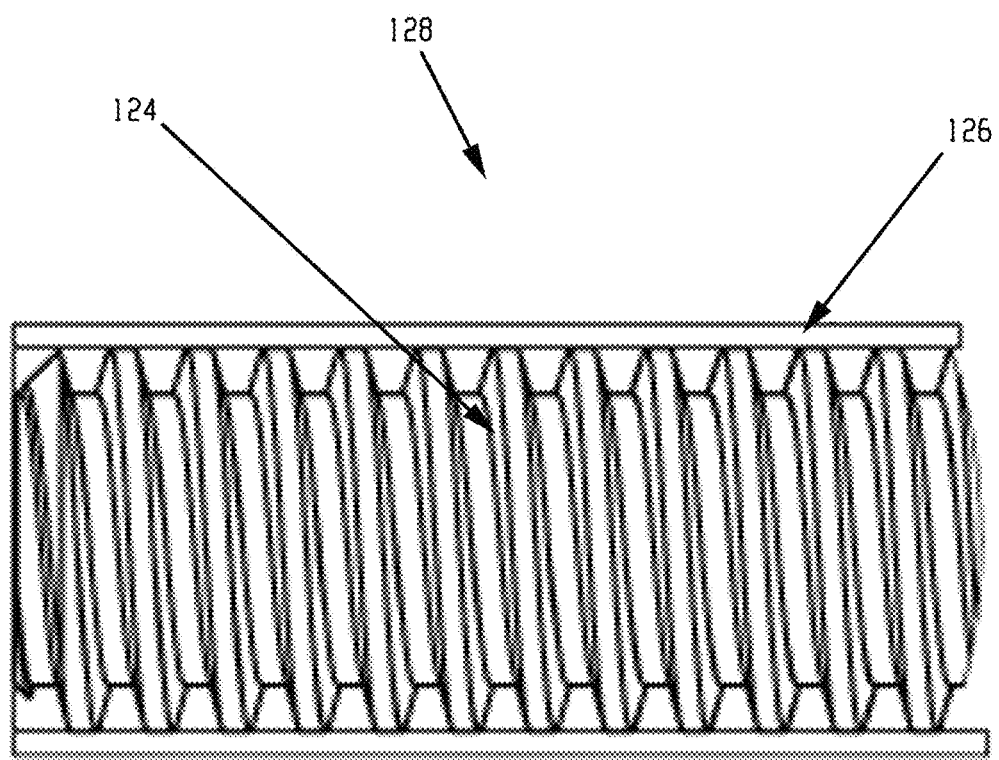

FIG. 12 is a radial/spiral flow path element designed to separate and extract one phase (e.g., liquid) from a two-phase input feed (e.g., a two-phase fluid input feed, such as liquid and vapor).

Figure 13:
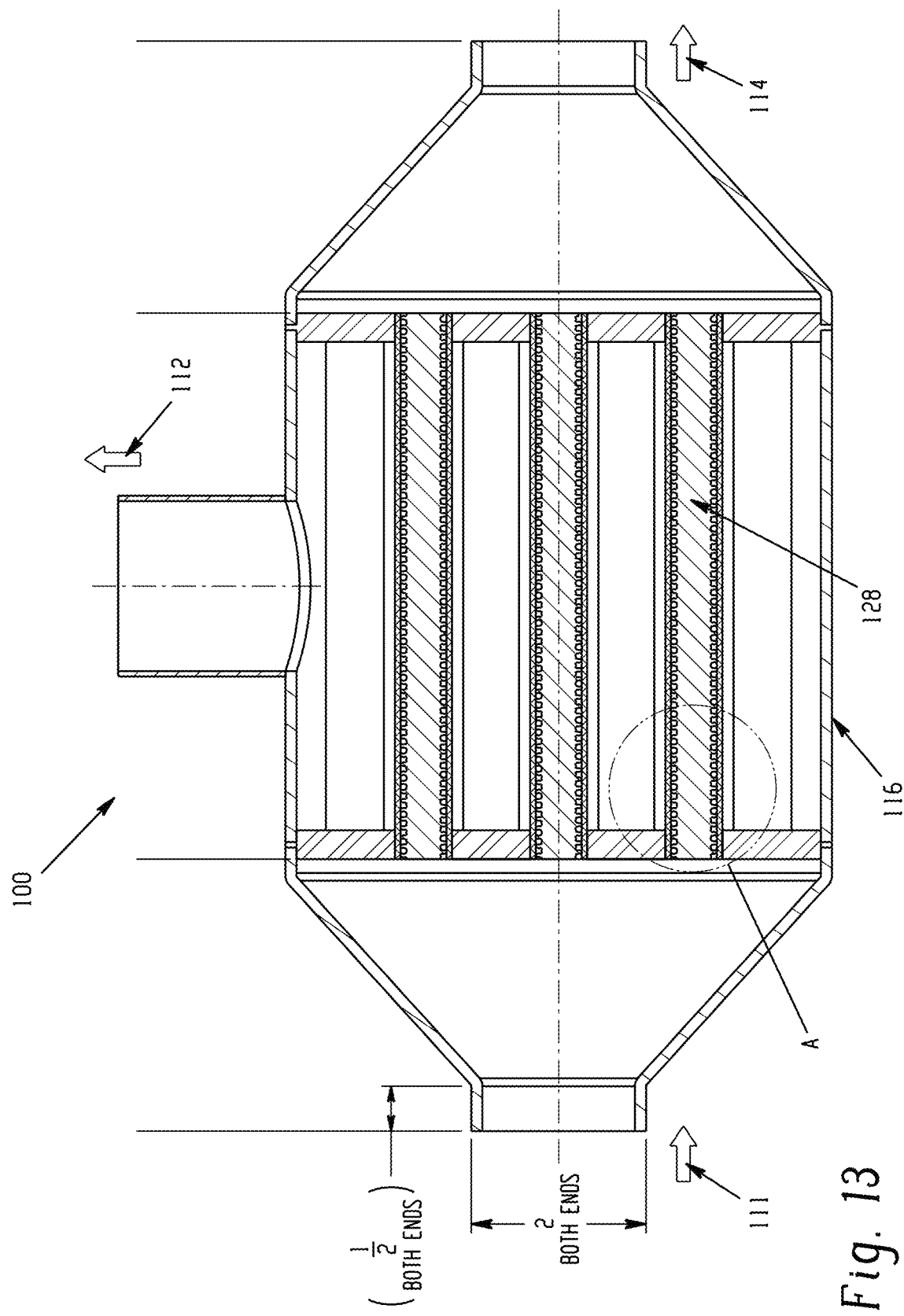

FIG. 13 is another exemplary phase separator device of the present disclosure showing a sectional view showing the two-phase inlet on the left, first phase outlet (e.g., vapor phase outlet) on the right and a second phase outlet (e.g., liquid outlet) at the top; the central housing includes multiple (e.g., thirty-one) parallel flow paths for fluid flow and separation.

FIGS. 14A-14E are additional drawings showing other views of the exemplary phase separator device of FIG. 13 utilizing multiple (e.g., thirty-one) parallel flow separation elements within the separator main housing; FIGS. 14A-14E are depictions of the phase separator device utilizing the radial/spiral liquid extractors.

Figure 15:
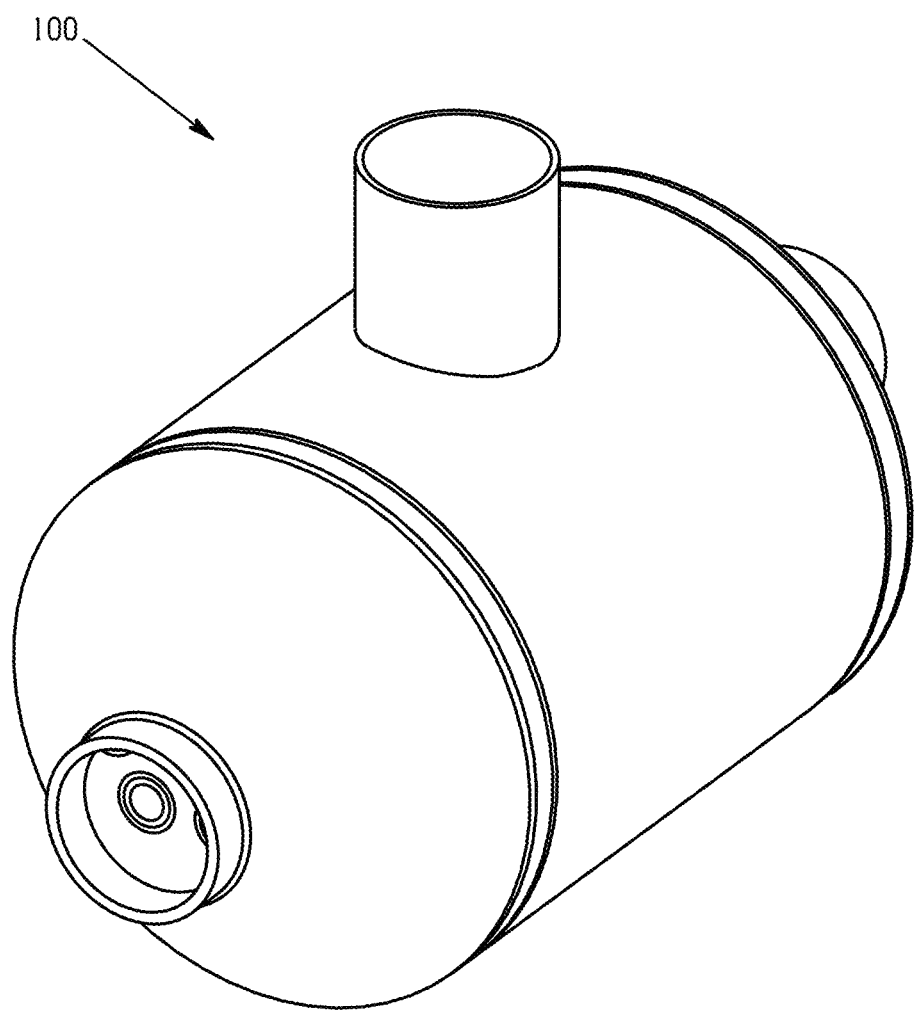

FIG. 15 shows an isometric view of the phase separator device of FIG. 13.

Figure 16:
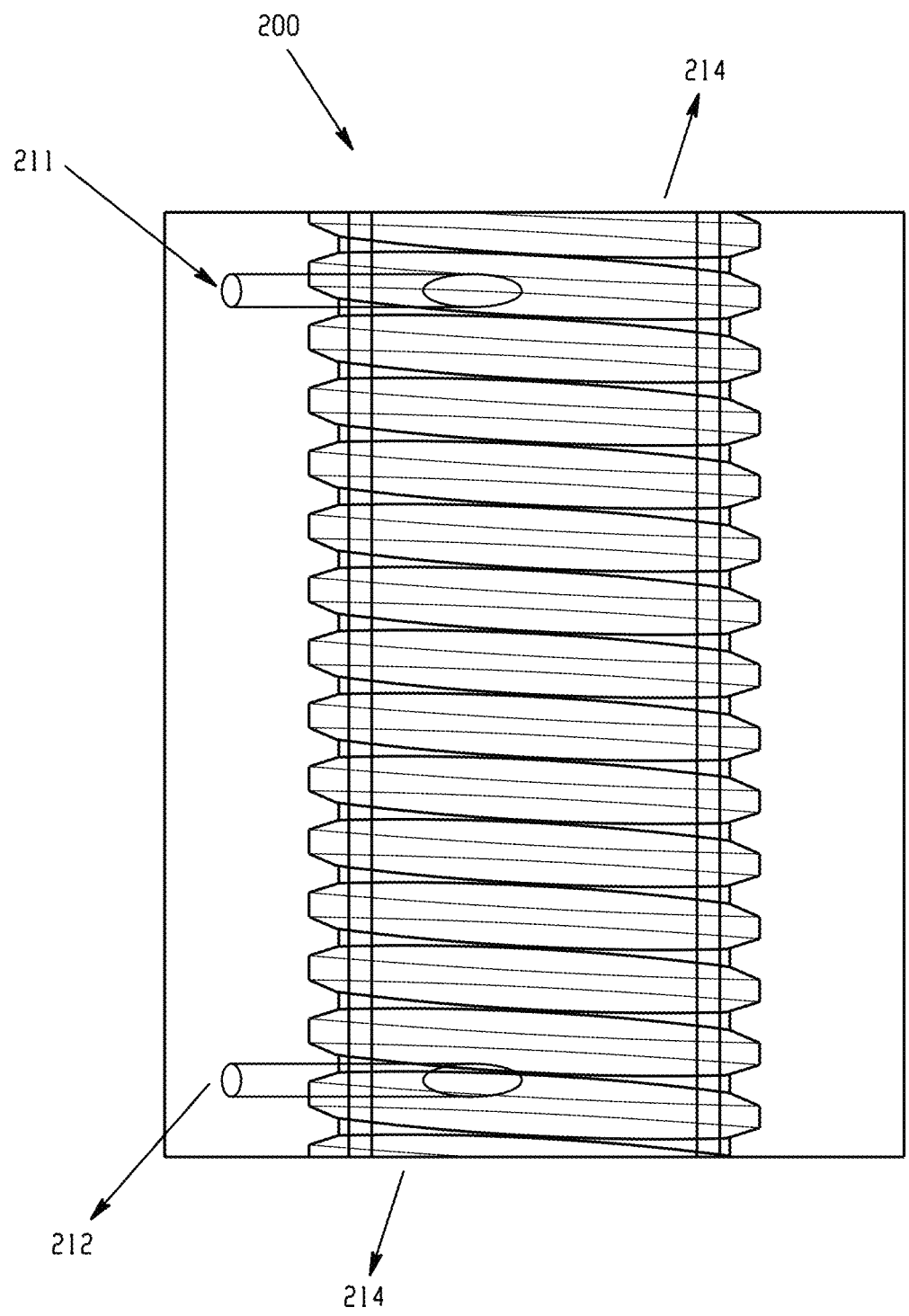

FIG. 16 is another exemplary phase separator device according to the present disclosure.

Figure 17:
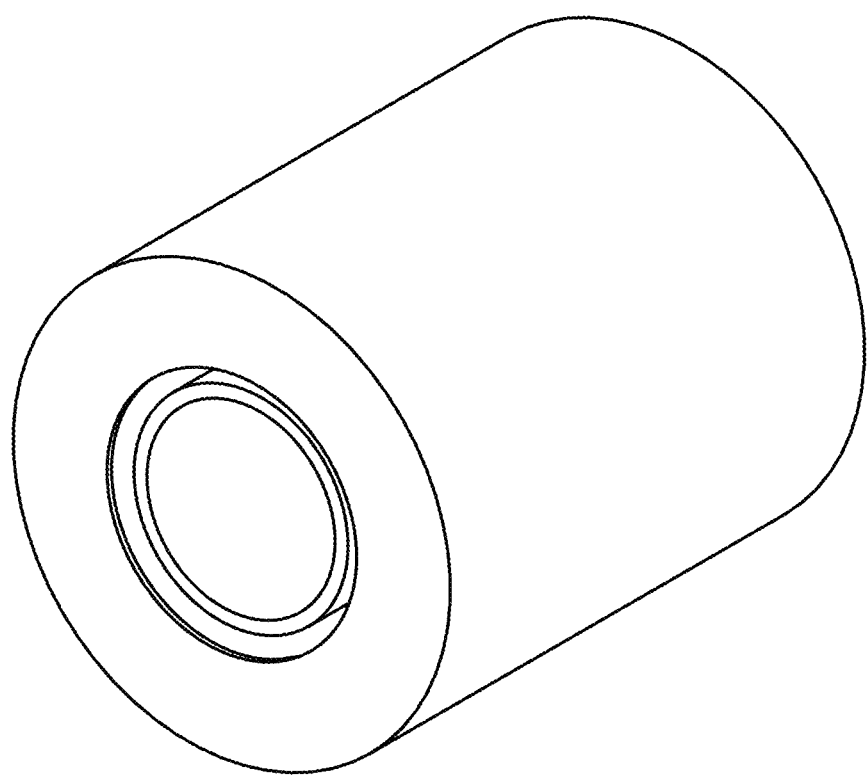

FIG. 17 depicts porous media inside a spiral cavity of a phase separator device according to the present disclosure.

Figure 18:
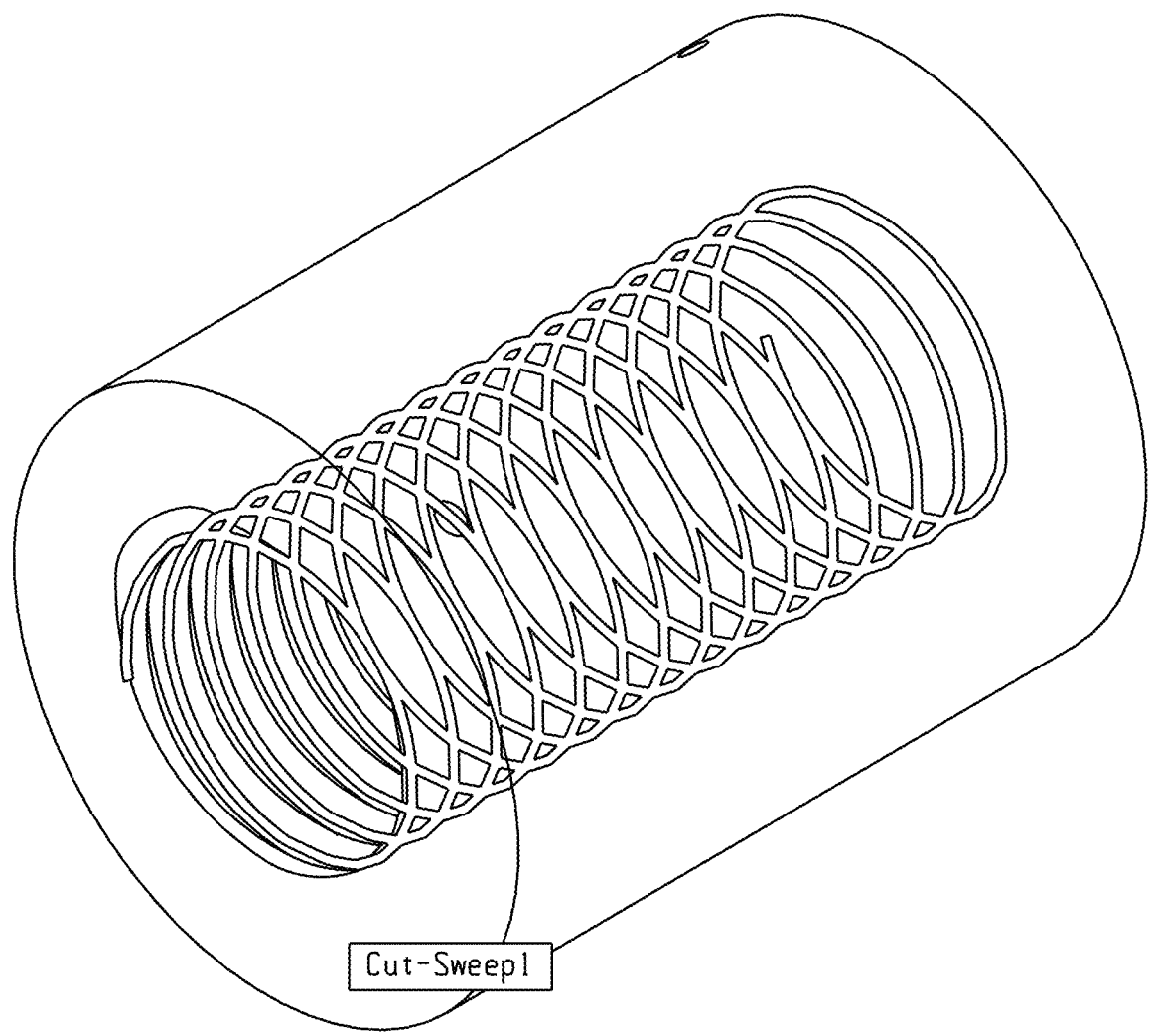

FIG. 18 depicts a spiral passage of a phase separator device according to the present disclosure.

Figure 19:
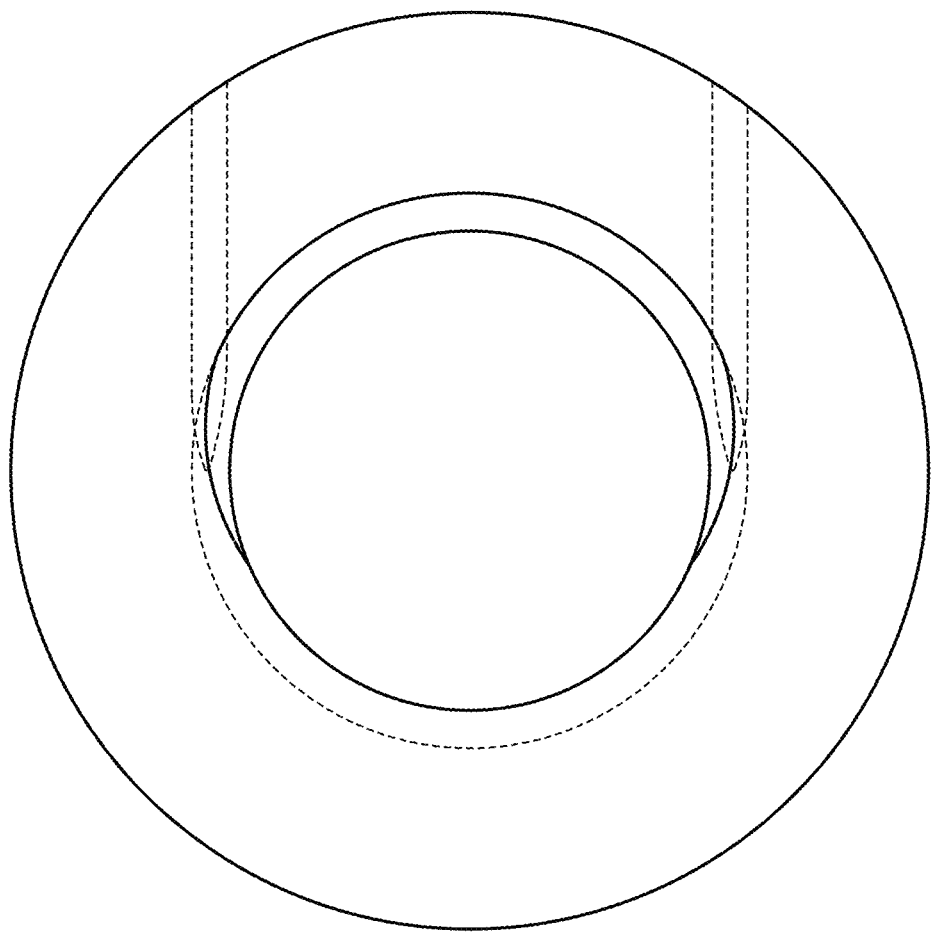

FIG. 19 depicts the orientations of the inlet(s) and the outlet(s) of a phase separator device according to the present disclosure.

Figure 20:
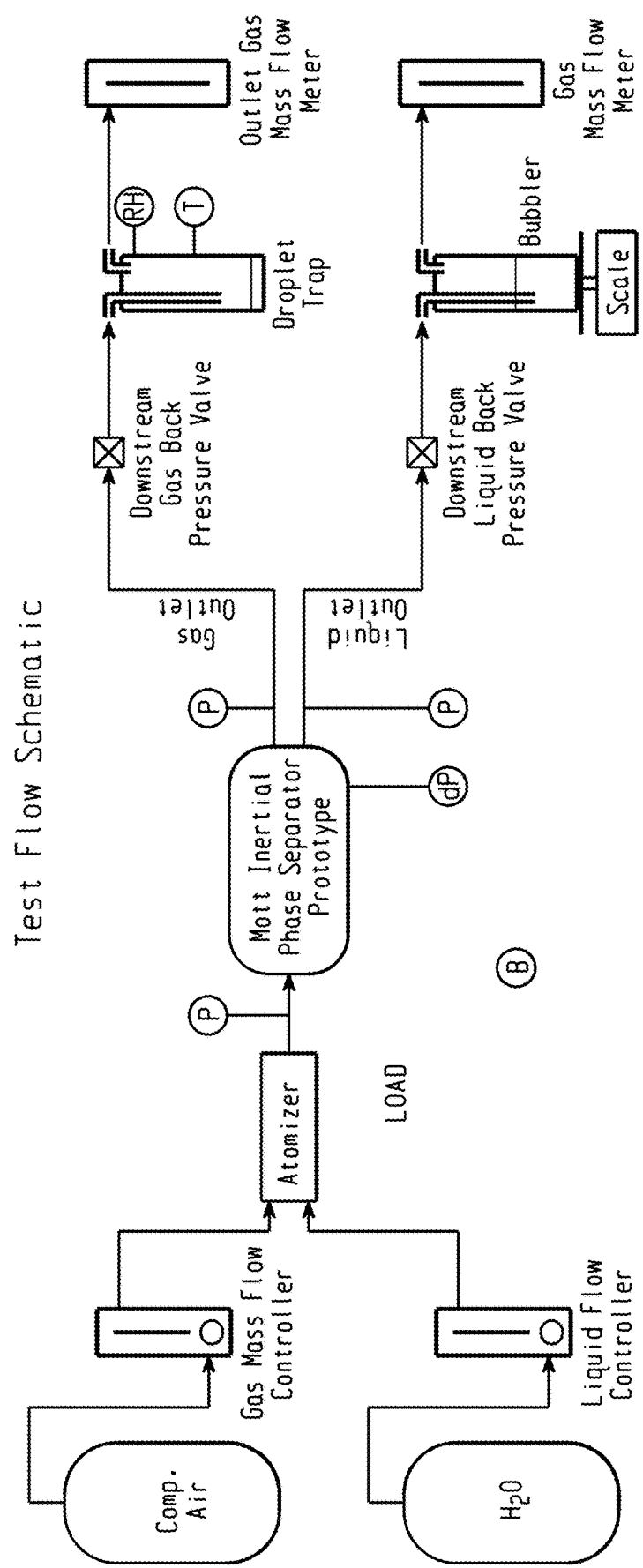

FIG. 20 shows a schematic diagram of an exemplary custom test stand.

Figure 21:
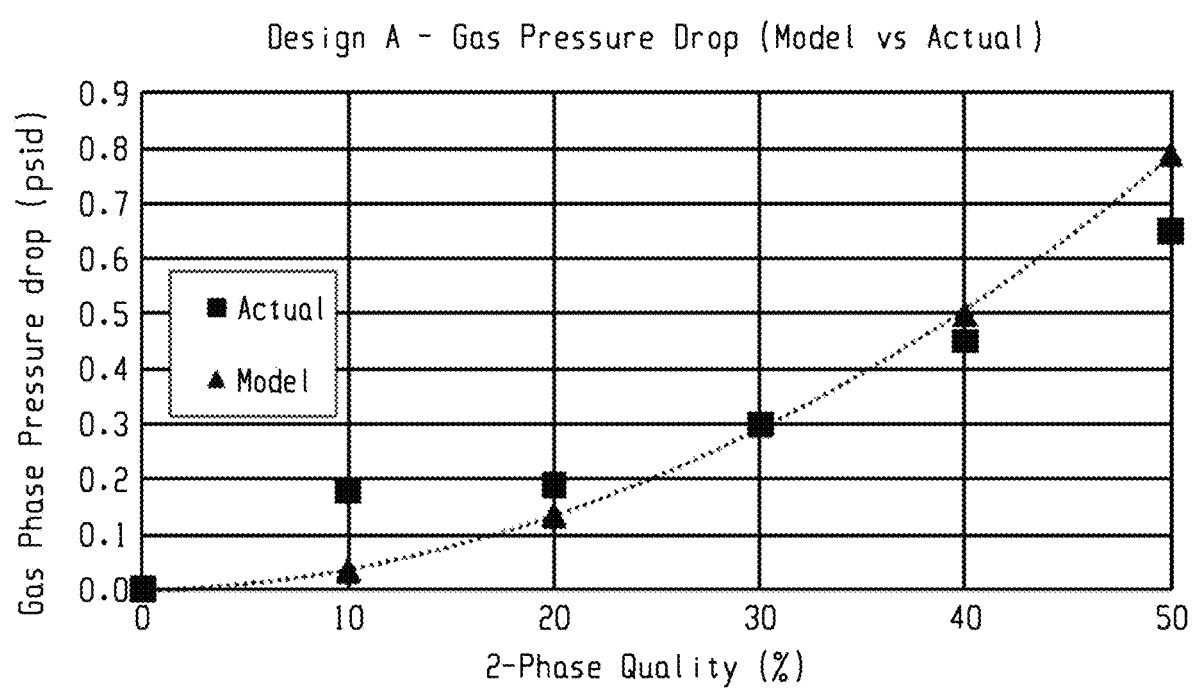

FIG. 21 is a graph showing the predicted gas phase pressure drops versus quality calculated using an analytical model and the experimentally measured values for Design A.

Figure 22:
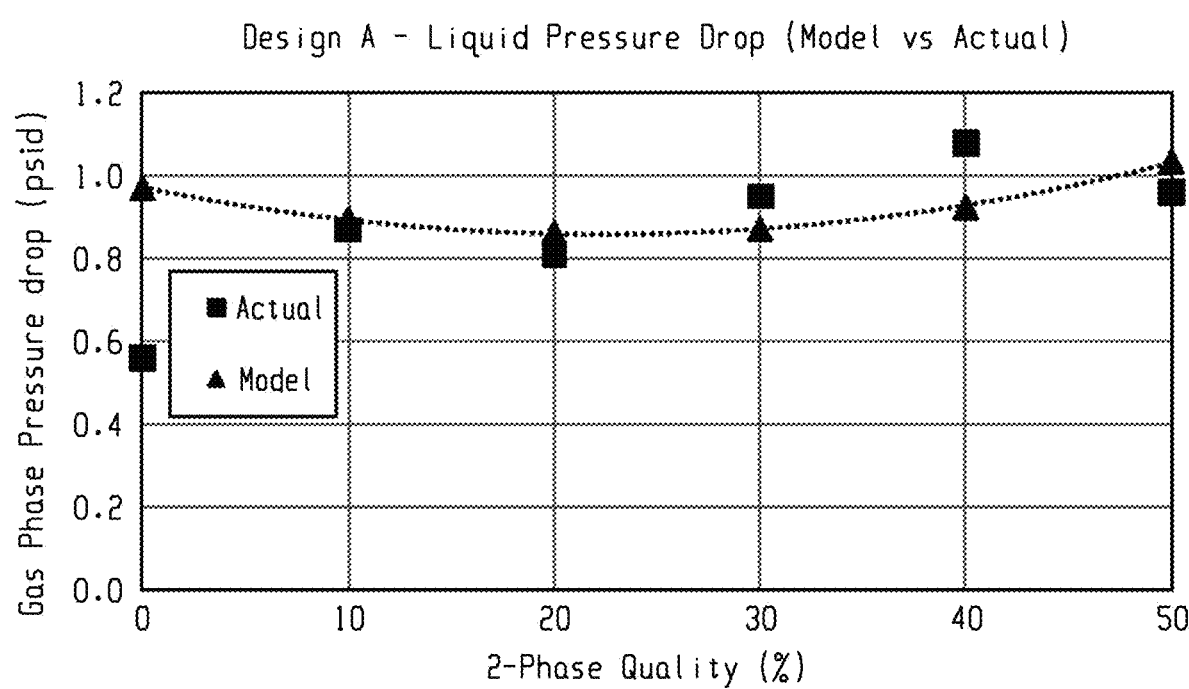

FIG. 22 is a graph showing the predicted liquid phase pressure drops versus quality calculated using an analytical model and the experimentally measured values for Design A.

Figure 23:
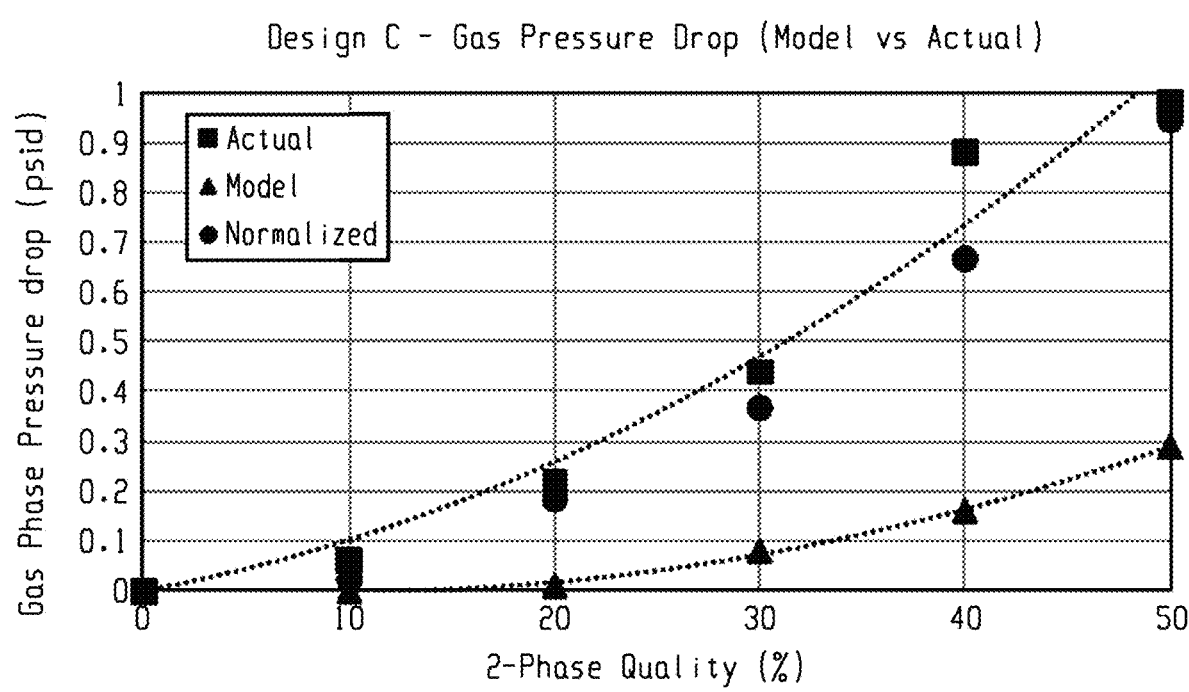

FIG. 23 is a graph showing the predicted gas phase pressure drops versus quality calculated using an analytical model and the experimentally measured values for Design C.

Figure 24:
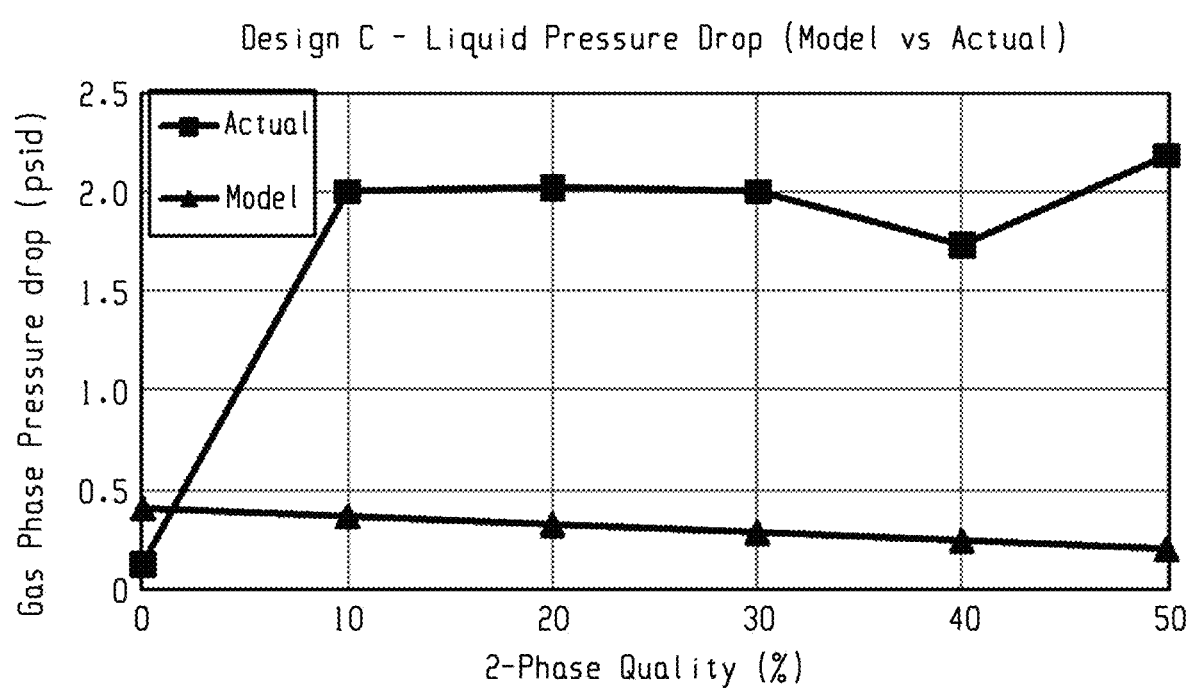

FIG. 24 is a graph showing the predicted liquid phase pressure drops versus quality calculated using an analytical model and the experimentally measured values.

DETAILED DESCRIPTION OF THE DISCLOSURE

The exemplary embodiments disclosed herein are illustrative of advantageous phase separator devices, and systems of the present disclosure and methods/techniques thereof. It should be understood, however, that the disclosed embodiments are merely exemplary of the present disclosure, which may be embodied in various forms. Therefore, details disclosed herein with reference to exemplary phase separator devices and associated processes/techniques of assembly and use are not to be interpreted as limiting, but merely as the basis for teaching one skilled in the art how to make and use the advantageous phase separator devices and/or alternative phase separator devices of the present disclosure.

The present disclosure provides advantageous phase separator devices for phase separation of input feeds, and improved systems/methods for utilizing and fabricating the phase separator devices.

More particularly, the present disclosure provides phase separator devices utilizing inertial separation and porous media extraction for the phase separation of two-phase input feeds (e.g., to separate an input feed of a two-phase mixture to a first phase output (e.g., to a liquid output flow) and to a second phase output (e.g., to a gas output flow)). The phase separator devices can be utilized at standard gravity to micro-gravity to zero gravity environments.

An exemplary phase separator device (e.g., two-phase flow separator device) of the present disclosure incorporates inertial separation and porous media extraction. The device separates two-phase input feeds (e.g., two-phase fluid flows) into a first phase output and a second phase output (e.g., a fluid output flow for each phase). In certain embodiments, the device can separate a mixed fluid flow of both liquid and gases. The liquid and gas can include liquid and vapor phases of the same chemical/constituent (e.g., ammonia), or may include liquid and gases of two different constituents (e.g., liquid water and air).

The two-phase input feed (e.g., two-phase input flow) can be at room temperature (e.g., about 20 to 25 degrees Celsius), or it can be at other operating temperatures.

The two-phase input feed/flow can be at atmospheric pressure (e.g., nominally 1 atm), or it may be at higher or lower pressures. For example, the exemplary phase separator device can be utilized for the separation of the two-phase input/flow/mixture flowing or input as a compressed fluid in a partial or full-closed loop system.

The two-phase flow/input can be at standard gravity to micro-gravity to zero gravity environments. It is noted that the separation, capture and extraction of the liquid phase (or solid phase) can be much more complicated in micro-gravity to zero gravity environments since gravity (gravitation forces) typically cannot be employed in such separation, capture and extraction processes.

In exemplary embodiments, a role of the phase separator device is to utilize the unique differences between the properties of the first phase output (e.g., liquid output) and the second phase output (e.g., gas components) in the two-phase input/mixture to achieve separation of the first and second phases (e.g., of the liquid and gas phases), e.g., especially employing the differences in density and/or capillary forces.

In certain embodiments, of interest is the separation and capture of the liquid phase. There are some approaches/technologies that can be employed to separate the liquid including: (i) cooling the two-phase mixture to condense the fluid; (ii) using de-misters; (iii) using inertial separators such as cyclone or impactors; (iv) using wicks to extract the liquid phase.

In regards to inertial separation, it is noted that the separation of the second phase (e.g., gas phase) from the first phase (e.g. liquid phase and/or solid phase) can be achieved via inertial properties to separate the denser phase (e.g. liquid phase and/or solid phase) from the lighter phase (e.g., gas phase) in the incoming input feed (e.g., incoming two-phase fluid stream).

The effectiveness of inertial separation increases with increasing mass (density) of the denser phase (e.g., liquid droplets or solid particles) compared to the lighter phase (e.g., gas density). Also, this effectiveness increases with the decreasing gas viscosity. Inertial separation technologies can be utilized in such devices as cyclones, centrifuges, impactors and particle scrubbers.

Referring now to the drawings, like parts are marked throughout the specification and drawings with the same reference numerals, respectively. Drawing figures are not necessarily to scale and in certain views, parts may have been exaggerated for purposes of clarity.

As shown in FIG. 1, the effectiveness of separation increases with increasing the inertia of the denser phase (e.g., liquid or solid particle) in the separation device by increasing its velocity. Furthermore, the separation also increases in cyclonic separation by decreasing the radius of curvature in the fluid passage (e.g., decreasing the radius of the separator housing).

In regards to axial flow separators (e.g., axial flow cyclones), it is noted that a design of an axial flow cyclone is illustrated in FIG. 2. A function of the axial flow cyclone is to separate the denser phase (e.g., liquid or solid particles—such as dust or the like) present in the incoming input feed (e.g., incoming gas stream) from the feed and provide a cleaned lighter output phase (e.g., gas stream or clean gas) and provide a denser output (e.g., stream of liquid or solid particles). In an axial flow cyclone, the incoming input feed (e.g., gas stream) and exiting cleaned lighter phase output (cleaned gas stream flow) can be on the same axis with the gas flow entering and exiting in the same direction of travel. Some major components of an axial flow cyclone are: the cylindrical housing; one or more guide vanes; and the exit passageways (openings) for the cleaned gas and the separated liquid or solid particles.

Axial flow cyclone technology has been employed in products, primarily for the separation of particles (solids or liquids) from gas streams in industrial applications or air intakes for engines and buildings. The axial flow cyclone removes the larger particles in the incoming gas stream for subsequent collection and use. In other uses, the axial flow cyclone functions as a pre-cleaner to remove a portion of the particles in the gas stream followed by additional particle collections (e.g., filters), thereby extending the life of the filter.

FIGS. 3 and 4 show the design for one stage in a five-stage cascade axial flow cyclone used to collect solid particles (e.g., dust) for subsequent use of particle size-fractionated samples. FIG. 5 shows the particle separation (collection efficiency) as a function of particle size for each stage of the five-stage cascade axial flow cyclone. In this example, the five stages were able to achieve separation and collection of particles as small as one micrometer. The collection efficiency for each stage was achieved by varying the pitch angle of the guide vanes and the inner and outer diameters of the guide vanes and the cyclone housing.

FIG. 6 illustrates an exemplary design and configuration of an embodiment of a phase separator device 10 (e.g., two-phase axial flow cyclone separator device 10) for input feeds 11 (e.g., for an input feed 11 of a liquid/gas mixture). As shown in FIG. 6, device 10 takes the form of a two-phase axial flow cyclone separator device 10, with an axial inlet 13 for the input feed 11. As such, phase separator device 10 is configured and dimensioned to be utilized for phase separation of input feeds 11 (a two-phase mixture 11) into a first phase output 12 (e.g., to a liquid output flow 12) and to a second phase output 14 (e.g., to a gas output flow 14).

More particularly and discussed further below, phase separator device 10 includes a housing 16 that extends from a first end to a second end, with the housing 16 having one or more first openings for the exit of the first phase output 12, and one or more second openings for the exit of the second phase output 14. One or more guide vanes 24 are disposed within housing 16 of phase separator device 10. As noted, device 10 includes an axial inlet 13 for the input feed 11. FIG. 7 shows another depiction of the phase separator device 10 of FIG. 6 (e.g., two-phase axial flow cyclone separator device 10, with an axial inlet 13 for the input feed 11).

In general, phase separator device 10 is configured and dimensioned to separate a denser phase (e.g., liquid phase) present in the incoming input feed 11 from the input feed 11 and provide a cleaned lighter phase output 14 (e.g., second phase output 14) and a denser output 12 (e.g., stream of liquid in first phase output 12). The incoming input feed 11 and exiting cleaned second phase output 14 can be on the same axis with the gas flow/input feed 11 entering and exiting in the same direction of travel.

The design of exemplary phase separator device 10 can utilize two distinct sections, and may utilize a third section, to achieve separation, collection and extraction of the first phase output 12 (liquid phase) from the second phase output 14 (gas phase). These sections can include: an axial flow cyclonic separation section 18; an optional liquid collection section 20 prior to the porous media section 22; and/or a porous media section 22 for liquid extraction.

A role of the porous media section 22 is to form a porous barrier that performs at least three important functions. First, section 22 serves as a barrier to allow for liquid accumulation and physically supports a layer of liquid accumulation. Second, the pressure drop across this liquid layer and porous membrane 22 prevents the flow of gas stream into the liquid exit since the pressure drop is much lower in the gas (vapor) exit passageway. Third, the porous media section 22 allows for the flow of the accumulating liquid to be extracted through a liquid exit. The liquid may be extracted via a suction pump located downstream of a liquid exit and/or one can utilize the upstream pressure in a pressurized system.

The porous media section 22 may be positioned in one or more locations in the axial flow separator device 10. As illustrated in FIG. 6, the porous media section 22 is located in the bottom portion, e.g., wall or bottom, of the annular collection section located downstream of the guide vanes 24. The porous media section 22 could also be located in the wall of the cylindrical housing 16 adjacent to the vanes or just downstream.

The porous media section 22 can be fabricated from several types of porous materials including, but not limited to: porous metal, polymeric membranes, foams, fibrous materials, polymers, ceramics, and/or glass. The porous metal can be materials from several metal alloys including, but not limited to nickel, cobalt, iron, copper, aluminum, palladium, titanium, tungsten, platinum, silver, gold, and alloys and oxides thereof including stainless steels and nickel-based steels such as Hastelloy® (Haynes Stellite Company, Kokomo, Ind.).

The mean pore size of the porous media section 22 can be as low at 0.1 microns and go as high as 100 microns (e.g., depending on the flow conditions, temperature, and/or fluid viscosities).

In some embodiments, the inner diameter of the cyclone housing 16 can range from about 0.5 to about 20 inches.

In certain embodiments, two or more parallel axial flow separator devices 10 can be employed in a parallel arrangement that can require the incoming mixed two-phase flow 11 to be divided into two or more parallel flows.

In another embodiment and as shown in FIG. 8, device 10' takes the form of a two-phase axial flow cyclone separator device 10', with a tangential inlet 15 for the input feed 11. As such, phase separator device 10' with the tangential inlet 15 is configured and dimensioned to be utilized for phase separation of input feeds 11 (a two-phase mixture 11) into a first phase output 12 (e.g., to a liquid output flow 12) and to a second phase output 14 (e.g., to a gas output flow 14).

Similar to device 10, phase separator device 10' includes a housing 16 that extends from a first end to a second end, with the housing 16 having one or more first openings for the exit of the first phase output 12, and one or more second openings for the exit of the second phase output 14. One or more guide vanes 24 can be disposed within housing 16 of phase separator device 10'. As noted, device 10' includes a tangential inlet 15 for the input feed 11.

Similar to the operation of device 10, the phase separator device 10' is configured and dimensioned to separate a denser phase (e.g., liquid phase) present in the incoming input feed 11 from the input feed 11 and provide a cleaned lighter phase output 14 (e.g., second phase output 14) and a denser output 12 (e.g., stream of liquid in first phase output 12). The incoming input feed 11 and exiting cleaned second phase output 14 can be on a different axis, with the gas flow/input feed 11 entering via tangential inlet 15 that is tangential to the axis of the exiting cleaned second phase output 14. As similarly discussed above relative to device 10, the device 10' with the tangential inlet 15 can include: an axial flow cyclonic separation section 18; an optional liquid collection section 20 prior to the porous media section 22; and/or a porous media section 22 for liquid extraction. As similarly discussed above, the porous media section 22 of device 10' may be positioned in one or more locations in the device 10', and the porous media section 22 can be fabricated from several types of porous materials.

It is noted that exemplary cyclone separator devices of the present disclosure (e.g., devices 10, 10', 300, 300') can be classified based on their fluid inlet configuration (13, 15, 313, 315) and the overall flow path through the cyclone separator device. FIGS. 7-10 illustrate four exemplary combinations of inlet designs (13, 15, 313, 315) and flow directions for the input (11, 311) and output (12, 14, 312, 314) fluid streams. FIGS. 9-10 are discussed in further detail below.

These four exemplary combinations of FIGS. 7-10 can be referred to as: (i) an axial inlet axial flow cyclone separator device 10 (FIG. 7); (ii) a tangential inlet axial flow cyclone separator device 10' (FIG. 8); (iii) an axial inlet reverse flow cyclone separator device 300 (FIG. 10); and (iv) a tangential inlet reverse flow cyclone separator device 300' (FIG. 9).

It is noted that there are numerous sub-variants of these four exemplary configurations as depicted in FIGS. 7-10. For example, one potential set of sub-variants can address the location of the discharge exits (12, 14, 312, 314) for the separated material. For example, these exits can be, but are not limited to, exits axially located in the bottom or on the side wall near the bottom end of the cyclone separator device (e.g., 12, 14, 312).

With reference to axial inlets 13, 313 and the tangential inlets 15, 315, it is noted that both of these two inlet configurations create the high velocity swirling motion required to separate the higher mass components, contained in the incoming mixed fluid stream 11, 311, via centripetal force. For example, these inlets configurations can be: (i) tangential inlets (15, 315 of FIGS. 8 and 9) where the incoming fluid stream 11, 311 tangentially enters the upper portion of the cylindrical cyclone separator device 10', 300'; and (ii) axial inlets (13, 313 of FIGS. 7 and 10) where the incoming fluid stream 11, 311 passes through a set of swirl (guide) vanes 24.

The overall flow path through the exemplary separator devices can be classified as: (i) axial flow (devices 10, 10' of FIGS. 7 and 8); and (ii) reverse flow (devices 300, 300' of FIGS. 9 and 10).

In the axial flow separator configurations (devices 10, 10' of FIGS. 7 and 8), the incoming fluid stream 11 and exiting cleaned/separated fluid streams 14 can be on the same axis with the gas/input stream 11 and the cleaned/separated streams 14 exiting in same direction of travel. In the reverse flow separator configurations (devices 300, 300' of FIGS. 9 and 10), the flow path of the cleaned/separated fluid 314 undergoes a 180 degree reversal in its axial flow direction as the fluid 314 enters the lower portion of the separator housing 316 and then exits in the opposite direction through exit tube located in the upper section of separator device 300, 300'.

It is noted that each of these four exemplary cyclone separator device configurations 10, 10', 300, 300' can be combined with the porous media 22, 322 to fabricate an advantageous two-phase separator device 10, 10', 300, 300' as provided by the present disclosure.

FIGS. 6 and 10/11 illustrate two examples for two design embodiments of a two-phase flow cyclone separator device 10, 300 (e.g., for liquid/gas mixtures). Both designs 10, 300 utilize two distinct sections, and may utilize a third, to achieve separation, collection and extraction of the liquid phase from the gas phase. These sections can include: a cyclonic separation section 18 (axial flow), 318 (reverse flow); an optional liquid collection section 20, 320 prior to the porous media section 22, 322; and/or a porous media section 22, 322 for liquid extraction, with a liquid extraction section below the porous media 22, 322.

In an embodiment and as shown in FIGS. 10 and 11, exemplary phase separator device 300 (e.g., two-phase reverse flow cyclone separator device 300, with an axial inlet 313 for the input feed) utilizes radial flow swirl (guide) vanes 324, coupled with a reverse flow cyclone separator device 300 design. FIG. 11 illustrates such a configuration. As discussed further below, it is noted that device 300 includes some similar components relative to device 10, and such similar components of device 300 can function in a similar manner to such similar components of device 10.

A primary difference between device 300 relative to device 10 is the location of the exits for the gas (314) and liquid (312) phases. In the reverse flow design as depicted in FIGS. 10 and 11 (e.g., two-phase reverse flow cyclone separator device 300, with an axial inlet 313 for the input feed), the gas undergoes a reversal of its flow direction (e.g., a 180 degree turn), thereby exiting in the reverse direction of the incoming fluid 311. The separated liquid stream 312 now passes through the porous media section 322 (e.g., section 322 shaped as a disc, rather than an annular-shaped porous media 22), and section 322 can be located at the lower end or side of the housing 316. In either case, a porous media membrane 322 is utilized to form an imperious barrier to vapor and to support a liquid layer 320.

As noted, FIG. 11 illustrates an exemplary design and configuration of an embodiment of a phase separator device 300 (e.g., two-phase reverse flow separator device 300) for input feeds (e.g., for an input feed of a liquid/gas mixture). As shown in FIG. 11, device 300 takes the form of a two-phase reverse flow cyclone separator device 300, with an axial inlet 313 for the input feed 311. As such, phase separator device 300 is configured and dimensioned to be utilized for phase separation of input feeds 311 (a two-phase mixture 311) into a first phase output 312 (e.g., to a liquid output flow 312) and a second phase output 314 (e.g., to a gas output flow 314).

More particularly and discussed further below, phase separator device 300 includes a housing 316 that extends from a first end to a second end, with the housing 316 having one or more first openings for the exit of the first phase output 312, and one or more second openings for the exit of the second phase output 314. One or more swirl (guide) vanes 324, located in series, are disposed within housing 316 of the phase separator device 300.

In general, phase separator device 300 is configured and dimensioned to separate a denser phase (e.g., liquid phase) present in the incoming input feed 311 from the input feed 311 and provide a cleaned lighter phase output 314 (e.g., second phase output 14) and a denser output 312 (e.g., stream of liquid in first phase output 312). The incoming input feed 311 and exiting cleaned second phase output 314 can be on the same axis with the gas/input feed 311, however, input feed 311 and output 314 are exiting in the opposite direction of travel.

The design of exemplary phase separator device 300 can utilize two distinct sections, and may utilize a third section, to achieve separation, collection and extraction of the first phase output 312 (liquid phase) from the second phase output 314 (gas phase). These sections can include: a reverse flow cyclonic separation section 318; an optional liquid collection section 320 prior to the prior media section 322; and/or a porous media section 322 for liquid extraction.

Exemplary device 300 can utilize an optional conical shaped skirt 328. This skirt is located on the outside of the gas exit tube 326 and below the swirl vanes 324. One or more skirts 328 may be incorporated into the design of device 300. The function of the skirt(s) is to improve the liquid separation efficiency by directing the liquid toward the outer wall of the separator housing 316 and away from the entrance to the gas exit tube. It is noted that devices 10, 10', 300' can also utilize an optional conical shaped skirt similar to conical shaped skirt 328.

Similar to device 10 discussed above, the design of exemplary phase separator device 300 can utilize two distinct sections, and may utilize a third section, to achieve separation, collection and extraction of the first phase output 312 (liquid phase) from the second phase output 314 (gas phase). These sections can include: a reverse flow cyclonic separation section 318; an optional liquid collection section 320 prior to the porous media section 322; and/or a porous media section 322 for liquid extraction.

Similar to section 22, a role of the porous media section 322 is to form a porous barrier that performs at least three important functions. First, section 322 serves as a barrier to allow for liquid accumulation and physically supports a layer of liquid accumulation. Second, the pressure drop across this liquid layer and porous membrane 322 prevents the flow of gas stream into the liquid exit since the pressure drop is much lower in the gas (vapor) exit passageway. Third, the porous media section 322 allows for the flow of the accumulating liquid to be extracted through a liquid exit. The liquid may be extracted via a suction pump located downstream of a liquid exit and/or one can utilize the upstream pressure in a pressurized system.

The porous media section 322 may be positioned in one or more locations in the axial flow separator device 300. As illustrated in FIG. 11, the porous media section 322 is located in the bottom portion, e.g., wall or bottom, and is located downstream of the guide vanes 324. It is noted that exemplary section 322 can be shaped as a disc or the like, although the present disclosure is not limited thereto. The porous media section 322 could also be positioned/located in and/or across the wall of the cylindrical housing 316 adjacent to the vanes or just downstream.

The porous media section 322 can be fabricated from several types of porous materials including, but not limited to: porous metal, polymeric membranes, foams, fibrous materials, polymers, ceramics, and/or glass. The porous metal can be materials from several metal alloys including, but not limited to nickel, cobalt, iron, copper, aluminum, palladium, titanium, tungsten, platinum, silver, gold, and alloys and oxides thereof including stainless steels and nickel-based steels such as Hastelloy® (Haynes Stellite Company, Kokomo, Ind.).

The mean pore size of the porous media section 322 can be as low at 0.1 microns and go as high as 100 microns (e.g., depending on the flow conditions, temperature, and/or fluid viscosities).

In some embodiments, the inner diameter of the cyclone housing 316 can range from about 0.5 to about 20 inches.

In certain embodiments, two or more parallel axial flow separator devices 300 can be employed in a parallel arrangement that can require the incoming mixed two-phase flow 311 to be divided into two or more parallel flows.

In another embodiment and as shown in FIG. 9, device 300' takes the form of a two-phase reverse flow cyclone separator device 300', with a tangential inlet 315 for the input feed 311. As such, phase separator device 300' with the tangential inlet 315 is configured and dimensioned to be utilized for phase separation of input feeds 311 (a two-phase mixture 311) into a first phase output 312 (e.g., to a liquid output flow 312) and to a second phase output 314 (e.g., to a gas output flow 314).

Similar to device 300, phase separator device 300' includes a housing 316 that extends from a first end to a second end, with the housing 316 having one or more first openings for the exit of the first phase output 312, and one or more second openings for the exit of the second phase output 314. One or more guide vanes 324 can be disposed within housing 316 of phase separator device 300'. As noted, device 300' includes a tangential inlet 315 for the input feed 311.

Similar to the operation of device 300, the phase separator device 300' is configured and dimensioned to separate a denser phase (e.g., liquid phase) present in the incoming input feed 311 from the input feed 311 and provide a cleaned lighter phase output 314 (e.g., second phase output 314) and a denser output 312 (e.g., stream of liquid in first phase output 312). The incoming input feed 311 and exiting cleaned second phase output 314 can be on a different axis, with the gas flow/input feed 311 entering via tangential inlet 315 that is tangential to the axis of the exiting cleaned second phase output 314. As similarly discussed above relative to device 300, the device 300' with the tangential inlet 315 can include: a reverse flow cyclonic separation section 318; an optional liquid collection section 320 prior to the porous media section 322; and/or a porous media section 322 for liquid extraction. As similarly discussed above, the porous media section 322 of device 300' may be positioned in one or more locations in the device 300', and the porous media section 322 can be fabricated from several types of porous materials.

FIG. 12 depicts a radial/spiral liquid phase extractor element 128. FIG. 12 shows an element 128 that is used to separate the liquid phase from a flowing two-phase fluid 111 (liquid and vapor input 111—FIG. 13). In exemplary embodiments, one can take a threaded rod 124 and encapsulate it into a porous media tube 126. The two-phase fluid 111 follows the spiral flow path shown in FIG. 12, and the inertial energy due to the circular flow path makes the denser fluid (e.g., liquid) move radially outwards and the lower density fluid (e.g., vapor) move inwards. This separation places the liquid phase in intimate contact with a porous tube 126 or the like. A differential pressure is then applied between the interior flow path and the volume outside the porous tube 126 which causes liquid flow through the porous tube 126. The magnitude of this differential pressure, the diameter and length of the element 128, the thread pitch and groove dimensions, the wetted surface area, the thickness and density and mean pores size of the tube 126 can all be tuned to provide nearly 100% efficiency in capturing the liquid phase and extracting it from the element 128.

In exemplary embodiments, the diameter of the threaded component 124 can be very small (on the order of 1/16" inch) to very large (several feet) depending on the flowrate of the two-phase fluid and allowable pressure drops. The thickness of the porous tube 126 can range from 0.010" to several inches depending on the application. The mean pore size in the tube 126 can be as low at 0.1 microns and go as high as 100 microns, again depending on the flow conditions, temperature, and/or fluid viscosities.

For the embodiments disclosed herein, the dimensions of the spiral flow path and of the porous media can remain constant along the length of the flow path. It is recognized that improved separation performance may be gained by varying the dimensions of the spiral flow path including cross section and pitch along the fluid flow path may be employed. In addition, the thickness of the porous media can also be adjusted along the length of the flow path to improve phase separation. For the embodiments disclosed herein, the porous media may have a constant mean pore size and density and that further optimization of performance can be achieved using a gradient pore size distribution within the porous media.

As shown in FIG. 13, to utilize the liquid extraction element 128 (or multiple elements 128), the element 128 can be inserted into a housing 116 that provides one inlet for the input feed 111 (liquid-vapor mixture feed 111) and two outlets: one for the first phase output 112 (e.g., liquid output), and one for the second phase output 114 (e.g., vapor). Each element 128 of phase separator device 100 will direct the two-phase fluid 111 entering the inlet for feed 111 to direct flow to the spiral flow path at one end (input 111 end) of each element 128. The gas outlet for the second phase output 114 of the device 100 can be connected to the opposite end of each element 128. The second outlet for the first phase output 112 (e.g., liquid) can be attached to the housing 116 that surrounds each element 128, and the second outlet for the first phase output 112 (e.g., liquid) can receive the liquid phase that flows through various porous media 126.

The porous media 126 can be fabricated from several types of porous materials including, but not limited to: porous metal, polymeric membranes, foams, fibrous materials, polymers, ceramics, and/or glass. The porous metal can be materials from several metal alloys including, but not limited to nickel, cobalt, iron, copper, aluminum, palladium, titanium, tungsten, platinum, silver, gold, and alloys and oxides thereof including stainless steels and nickel-based steels such as Hastelloy® (Haynes Stellite Company, Kokomo, Ind.).

The device 100 may contain a single element 128 as described above, or device 100 can include a plurality of elements 128, in either series and/or parallel flow path configurations. Depicted in FIG. 13 is such an exemplary device 100 that includes thirty-one liquid phase separator elements 128, the elements 128 in a parallel flow path configuration.

FIG. 16 shows a phase separator device 200 that is used to separate the phases from a flowing two-phase fluid 211 (liquid and vapor). The design is a spiraled passage, possibly of non-constant surface area, and one surface of the passage is a porous media as shown in FIG. 17. The mixed phase fluid 211 enters tangentially to the spiral passage as shown in FIGS. 16 and 19. The two-phase fluid 211 follows the spiral flow path shown in FIG. 18 and only the liquid phase exits tangentially to the spiral passage, via output 212. The centripetal force due to the circular flow path makes the denser fluid (liquid), having more inertia, move radially outwards thus driving the lower density fluid (vapor), having less inertia, inwards. This separation places the gas phase in intimate contact with the porous media. The other side of the porous media is at a lower pressure, providing a differential pressure that causes the gas to flow through the porous media. The gas phase will exit both ends along the central axis to the spiral, via outputs 214, and be collected via additional piping (not shown).

The sizing of the diameter, length of the device 200, pitch of the spiral, spiral dimensions, the thickness, density, and average pores size of the porous media of device 200 can be varied based on the requirements of the use of the device 200 and the input/fluid 211 being separated.

The porous media of device 200 can be fabricated from several types of porous materials including, but not limited to: porous metal, polymeric membranes, foams, fibrous materials, polymers, ceramics, and/or glass. The porous metal can be materials from several metal alloys including, but not limited to nickel, cobalt, iron, copper, aluminum, palladium, titanium, tungsten, platinum, silver, gold, and alloys and oxides thereof including stainless steels and nickel-based steels such as Hastelloy® (Haynes Stellite Company, Kokomo, Ind.).

EXAMPLES

The following examples are merely illustrative of the phase separator devices disclosed herein and are not intended to limit the scope hereof. It is noted that the surrogate fluid testing of exemplary proposed designs that utilized inertial separation with a porous media vapor barrier verified the feasibility of liquid/vapor phase separation. This was a main objective of this project phase; therefore, the exemplary project was successful. The performance of both Designs A and C (discussed below) exceeded the minimum performance specifications for this exemplary project phase, which were liquid capture efficiency of greater than 75% and pressure drops for each fluid pathway of less than 5 PSID.

The reverse flow cyclone (Design A) provided the best liquid capture efficiency for the three designs that were evaluated. The measured liquid capture efficiencies ranged from 93% to 100% depending on the quality factor. This design also provided the lowest pressure drops across the separator with pressure drop less than 1 PSID for both the liquid and gas flow paths.

The liquid extractor (Design C) performed similar to Design A with the same low pressure drop for the gas flow path. This design showed slightly lower liquid capture efficiencies at 40% and 50% qualities and had a higher liquid pressure drop.

The gas extractor (Design B) did not perform well in initial testing and the run for record was not performed using this configuration due to the superior performance achieved with Designs A and C.

Mathematical models were developed to predict the pressure drop across both the gas and liquid flow paths. These models account for liquid and gas properties and the effects of operating pressure, temperature and flow rates. The model is designed to be suitable for subsequent scale up of the separators and their operation with working fluids.

A proof of principle (PoP) was performed to determine if inertial separation technology in combination with exemplary porous media technology could be used to create a vapor/liquid phase separator for use in cooling lasers in directed energy weapon systems. For this current phase, the target liquid separation efficiency was greater than 75% at 50% quality and fluid pressure drop of less than 15 psid. Surrogate fluids, comprising water and air, were used to test the functionality of three different exemplary phase separator designs scaled to approximately 1% flow, by mass, of the full-scale final device. The experimental results of this study were evaluated against the aforementioned targets. Furthermore, the data was used to validate the analytical models. These models can be further developed to scale and optimize the designs for future phases of this multi-phase project.

Test Procedure/Equipment

A custom test stand was constructed to evaluate exemplary phase separator designs for operational performance utilizing surrogate fluids, water and air, at near ambient conditions. These surrogate fluids were used to simulate a two-phase mixture of refrigerant at critical temperature for its operating pressure (R717 at 20° C. and 124 PSIG). FIG. 20 shows a schematic diagram of this custom test stand. Pressurized water and air were supplied through flow meters (left side) that enter a water atomizer, which in this case was a conventional paint spray gun that was modified for this purpose. The resulting two-phase mixture was then fed into the PoP phase separator's inlet port. The device separates the gas and liquid which exit through their respective outlets. Valves, located on the outlets, were used to adjust the pressures within the system. The output flow streams then passed through traps to separate the two phases and the gas flow was measured with flow meters. Pressure sensors, located at the inlet and outlet ports, were used to monitor the system pressures and pressure drops. The gas temperature and relative humidity (RH) were monitored within the liquid trap on the gas outlet flow path.

A simplified description of the test procedure is as follows: (i) install phase separator onto test stand and verify all connections to be leak free; (ii) set the water and air input flow rates to the desired quality; (iii) adjust the gas outlet back pressure valve to attain the desired system input pressure and the liquid outlet back pressure valve for optimal liquid capture efficiency; (iv) wait for the system to stabilize and record all pressures, flow rates, temperature, and RH; and (v) repeat for each quality level to be tested.

A max flow rate of 80 standard liters per minute (SLPM) was used during testing, if 0% relative humidity (RH) input is assumed and a maximum of 80% RH output that was observed during the testing with an air temp between 15-20° C. It is noted that the maximum amount of water that air can hold is 12.8 g/m3 at 15° C. and 17.3 g/m3 at 20° C.

Design A—Reverse Flow Cyclone

FIG. 10 is a schematic diagram showing the main components of a proposed design (a version of Design A). In regards to the operation of FIG. 10 (a version of Design A), it is noted that: (i) flow through the reverse flow cyclone vanes creates a centripetal force to separate liquid from gas; (ii) liquid flows to the exterior and bottom of the housing; (iii) the porous membrane and liquid layer provides an impervious barrier to gas flow; (iv) liquid extraction occurs via a controlled differential pressure across the membrane; and (v) the vapor phase exits through the vertical exit. It is noted that such exemplary cyclone separators are robust in design, and are very reliable. It is noted that the use of porous media to support a liquid layer advantageously provides a barrier to vapor transmission while at the same time allowing liquid to pass.

FIG. 9 shows another version of a Design A phase separator that was constructed for evaluation along with some of its key components. The vane assembly imparts the cyclonic motion to separate the liquid and gas phases and the cone shaped skirt 328 reduces the amount of liquid that exits the separator through the vapor exhaust port. The housing at the top was constructed using a PVC tee fitting, the housing at the liquid outlet was constructed using a PVD cap and the main body housing and vapor exhaust tube was constructed using clear polycarbonate tubing. It is noted that the version of the Design A phase separator shown in FIG. 9 was assembled to and tested utilizing the custom test stand of FIG. 20.

Numerous experiments were performed utilizing the version of the Design A phase separator shown in FIG. 9, adjusting the length of the main housing body, the relative placement of the rotary vanes and extension of the inner vapor extraction tube and the media grade (mean pore size), and thickness of the porous media prior to executing the run for record. It was found that the use of Media Grade 2 porous media with an inlet pressure of 4.0 psi provided liquid efficiency separation exceeding 90% at all mixture quality levels tested for this scale size phase separator (the version of the Design A phase separator shown in FIG. 9).

Table 1 shows some key summary results from the run for record test for the version of the Design A phase separator shown in FIG. 9. It should be noted that at all quality levels, no gas was observed exiting the device through the liquid port.

TABLE 1

Design A (FIG. 9) - Run for Record Summary Data
Design A - Run for Record Summary

| Parameter | Quality | | | | | |
|---|---|---|---|---|---|---|
| | 50% | 40% | 30% | 20% | 10% | 0% |
| Liquid Flow IN (g/s) | 1.66 | 2.00 | 2.33 | 2.66 | 3.00 | 3.33 |
| Gas Flow IN (g/s) | 1.69 | 1.33 | 1.00 | 0.67 | 0.34 | 0 |
| Two-Phase Inlet Pressure (psig) | 4.07 | 4.06 | 3.98 | 4.04 | 3.95 | 3.94 |
| Liquid Pressure Drop (psid) | 0.96 | 1.08 | 0.95 | 0.81 | 0.87 | 0.56 |
| Gas Pressure Drop (psid) | 0.65 | 0.45 | 0.30 | 0.19 | 0.18 | 0* |
| Liquid Capture Efficiency (%) | 93 | 99 | 94* | 99 | 100** | 100** |

*Actual efficiency is higher than reported due to uncertainty in setting the input liquid flow controller setpoint
**No liquid droplets were observed exiting the gas outlet port The results shown in Table 1 show Design A (FIG. 9) has met performance requirements with the liquid and gas pressure drops across the separator all below 1 PSID, and is close to target with the liquid capture efficiencies greater than 93%.

Design B—Gas Extractor

FIG. 16 is a schematic diagram showing the main components of this proposed design. In regards to the operation of FIG. 16 (Design B), it is noted that: (i) flow through spiral passageway creates a centripetal force to separate liquid from gas; (ii) liquid moves outwards and travels the entire length of the spiral flow path; and (iii) gas flows inwards and passes through interior porous membrane via a controlled pressure differential and exits axially from the device.

This proposed design (Design B) is unique and very different than Design A. The two-phase mixture follows a spiral flow path and the intent is that all of the gas phase moves towards the center and through porous media. The liquid continues to flow through the spiral path and exits the device.

FIG. 16 suggests a constant cross section through the spiral flow path. It was recognized early that there would be a significant pressure drop with the exiting gas along the spiral flow path and modified the spiral flow path to be a variable pitch, variable cross section helix. As such, a first generation prototype was created. For the first generation prototype, the two-phase inlet channel starts with a diameter of 1 inch and continuously reduces in diameter of approximately ⅛" at the liquid exit port. The spacing between the channels remains constant resulting in a variable pitch along the flow path length. The purpose of this change was to create a more uniform pressure drop across the length of porous media producing a constant gas extraction. It is noted that initial testing with this prototype resulted in poor separation efficiencies. Almost all the liquid phase exited through the porous media with the gas phase. It was deduced that this design did not have enough centripetal force to separate the two fluids and if one created a modified design with a much smaller diameter, one would have greater inertial separation and thus better performance.

It is noted that a second generation of the Design B phase separator was fabricated. This design was significantly smaller and had a deeper internal spiral channel aspect ratio. Continued testing with this design, varying flow rates and the media grade of the porous element resulted in separation performance levels better than the first generation design. Testing observed up to 50% liquid capture efficiency levels at quality levels of 20% and lower and much lower liquid capture efficiencies above 20% quality. The Run for Record testing was not performed on this design due to its low phase separation efficiency.

Design C—Liquid Extractor

FIG. 12 is a schematic diagram showing the proposed construction of the liquid extractor individual element, and FIG. 13 shows how they can be placed in a bundle and operated in parallel to increase scale. In regards to the operation of FIG. 13 (Design C), it is noted that: (i) flow through spiral passageway creates a centripetal force to separate liquid from gas; (ii) gas flows inwards and travels the entire length of the spiral flow path; (iii) the porous membrane and liquid layer provides an impervious barrier to gas flow; (iv) liquid flows outwards and passes through exterior porous membrane using a controlled pressure differential; and (v) liquid exits via a side port on the separator.

This design is similar to Design A in that it uses inertial energy to separate the liquid and vapor phases and the separated liquid passes through porous media. It differs from Design A in that during the separation, the liquid is in immediate contact with the porous media for separation.

A single spiral element (e.g., FIG. 12) was used for this PoP testing. The two-phase fluid enters from the right through an ABS plastic housing with internal vanes to initiate cyclonic motion. The fluid then passes through the spiral cavity pushing the liquid outwards and keeping the vapor phase towards the center. Liquid passes through the porous media and the vapor phase exits through the spiral channel to the left. The center housing was made using clear polycarbonate plastic so that one could observe if any vapor phase passed through the porous media. It is noted that the Design C phase separator was assembled to and tested utilizing the custom test stand of FIG. 20.

Numerous experiments were performed adjusting the length of the main housing body (1 or 2 inches), media grade (0.2, 0.5, and 2 mean pores sizes), and porous thickness (0.062 and 0.125"). It was found that the use of media grade 2 porous media with an inlet pressure of 5.0 psig provided liquid separation efficiency of approximately 80% and higher for all mixture quality levels tested.

Table 2 shows some key summary results from the run for record (R4R) test for Design C. It should be noted that in all cases, no gas was observed exiting the device through the liquid port.

TABLE 2

Design C - Run for Record Summary Data
Design C - R4R Summary

| Parameter | Quality | | | | | |
|---|---|---|---|---|---|---|
| | 50% | 40% | 30% | 20% | 10% | 0% |
| Liquid Flow IN (g/s) | 1.66 | 2.00 | 2.33 | 2.66 | 3.00 | 3.33 |
| Gas Flow IN (g/s) | 1.69 | 1.34 | 1.00 | 0.66 | 0.35 | 0 |
| Two-Phase Inlet Pressure (psig) | 5.10 | 5.05 | 5.02 | 5.04 | 5.01 | 4.99 |
| Liquid Pressure Drop (psid) | 2.18 | 1.73 | 2.00 | 2.02 | 2.00 | 0.13 |
| Gas Pressure Drop (psid) | 0.98 | 0.88 | 0.44 | 0.22 | 0.06 | 0 |
| Liquid Capture Efficiency (%) | 79 | 84 | 91 | 99 | 100* | 100* |

*No liquid droplets were observed exiting the gas outlet port

Discussion—Testing Analysis—Design Comparisons:

Table 3 below shows the combined summary results for both Designs A and C. The liquid and gas phase pressure drop across each design along with their liquid capture efficiencies versus quality. The results clearly show that the reverse flow cyclone, Design A, outperformed the Liquid Extractor, Design C, in terms of the liquid capture efficiency. Design A started off at 93% efficient at 50% quality and quickly rose to 99% at the lower qualities. It is suspected at this time that the lower efficiency at 30% is due to instrumentation/setup error. Design C started off at a lower liquid capture efficiency of 79% and rose to very high efficiencies for the lower qualities but did so at a slightly slower rate.

Both Designs A and C started off with about 1 PSID pressure drops for the gas outlets and they both steadily decreased to 0 PSID as the quality was reduced from 50% to 0%. This steady decrease in gas phase pressure drop with quality was expected and the trends match the engineering design models.

TABLE 3

Combined Summary Performance Results:
Combined Performance Results for Designs A and C

| Design | Parameter | Quality | | | | | |
|---|---|---|---|---|---|---|---|
| | | 50% | 40% | 30% | 20% | 10% | 0% |
| A Reverse Cyclone | Liquid Pressure Drop (PSID) | 0.96 | 1.08 | 0.95 | 0.81 | 0.87 | 0.56 |
| | Gas Pressure Drop (PSID) | 0.65 | 0.45 | 0.30 | 0.19 | 0.18 | 0 |
| | Liquid Capture Efficiency (%) | 93 | 99 | 94 | 99 | 100 | 100 |
| C Liquid Extractor | Liquid Pressure Drop (PSID) | 2.18 | 1.73 | 2.00 | 2.02 | 2.00 | 0.13 |
| | Gas Pressure Drop (PSID) | 0.98 | 0.88 | 0.44 | 0.22 | 0.06 | 0 |
| | Liquid Capture Efficiency (%) | 79 | 84 | 91 | 99 | 100 | 100 |

Comparison of Model Predictions to Experimental Data—Design A

Table 4 and FIG. 21 is a table and graph showing the predicted gas phase pressure drops versus quality calculated using an analytical model and the experimentally measured values for Design A. In FIG. 21, the modeled pressure drops are shown in diamonds and the experimental results are shown in rectangles on the graph. Except for the 10% quality data point, the model predicted pressure drop averages within 20% of the experimentally measured data and follows a similar nonlinear upward tread. The data, if plotted as a function of gas flow rate, shows that the pressure primarily increases as the square of the gas flow rate plus a few secondary factors, which is what one would expect from a fundamentals standpoint. The model accounts for the fluid density, viscosity, and actual gas velocity within the separator, which are all temperature and pressure dependent.

TABLE 4

Design A - Gas DP Data:
Gas Phase dP

| Quality (%) | Model (psid) | Actual (psid) |
|---|---|---|
| 50 | 0.788 | 0.65 |
| 40 | 0.498 | 0.45 |
| 30 | 0.299 | 0.3 |
| 20 | 0.134 | 0.19 |
| 10 | 0.035 | 0.18 |
| 0 | 0.000 | 0 |

Table 5 and FIG. 22 is a table and graph showing the predicted liquid phase pressure drops versus quality calculated using an analytical model and the experimentally measured values for Design A. In FIG. 22, the modeled pressure drops are shown in diamonds and the experimental results are shown in rectangles on the graph. The model accounts for the fluid density, viscosity, and actual gas velocity within the separator, which are all temperature and pressure dependent.

Except for the 0% quality data point, the model predicted pressure drop averages are within 10% of the experimentally measured data. Interestingly, the pressure drop data, when plotted as either a function of quality or liquid flow rate, are relatively constant. Thus, pressure drop is relatively independent of liquid flow rate. At first glance, this result seems inconsistent with a fundamental belief that pressure drop normally increases with increasing flow rate. However, the data is indeed correct, and this unusual finding results from two aspects that collectively combine for the overall pressure drop in the liquid flow path. The first portion of the pressure occurs in the entrance region and across the swirl vanes of the cyclone. In this region the pressure drop of the mixed fluid stream is primarily a result of the gas flow rate. Furthermore, this pressure drop dependence varies as the square of the gas flow rate plus a few secondary factors. The pressure drop decreases with decreasing gas flow rate and mixture quality. The second principal region for liquid pressure drop occurs across the exemplary porous metal media. Here the pressure drop increases linearly with liquid flow rate and, thus, deceasing mixture quality. These two trends, one increasing while the other is decreasing, results in a pressure that is relatively independent of mixture quality.

TABLE 5

Design A - Liquid DP Data:
Liquid Phase dP

| Quality (%) | Model (psid) | Actual (psid) |
|---|---|---|
| 50 | 1.034 | 0.96 |
| 40 | 0.924 | 1.08 |
| 30 | 0.871 | 0.95 |
| 20 | 0.862 | 0.81 |
| 10 | 0.895 | 0.87 |
| 0 | 0.970 | 0.56 |

Comparison of Model Predictions to Experimental Data—Design C

Table 6 and FIG. 23 is a table and graph showing the predicted gas phase pressure drops versus quality calculated using an analytical model and the experimentally measured values for Design C. In FIG. 23, the modeled pressure drops are shown in diamonds and the experimental results are shown in rectangles on the graph. The modeled data is slightly over ½ the values of the experimental data but shows the same overall trend. A set of swirl vanes was installed in the inlet housing, as mentioned in the results section, to initiate cyclonic motion before the fluid reached the separator element and this was not accounted for in our modeling which might explain the higher than expected pressure drops. The black circles shown in FIG. 23 are the predicted pressure drops with an adjustment to account for these additional vanes in the device and other restrictions. The adjusted model results follow the same trend as the experimentally measured results following 2nd order curvature which is expected by theory.

TABLE 6

Design C - Gas DP Data:
Gas Phase dP

| Quality (%) | Model (psid) | Actual (psid) |
|---|---|---|
| 50 | 0.43 | 0.98 |
| 40 | 0.29 | 0.88 |
| 30 | 0.16 | 0.44 |
| 20 | 0.08 | 0.22 |
| 10 | 0.01 | 0.06 |
| 0 | 0 | 0 |

Looking at the modeled liquid pressure drops for design C and the experimental results measured, there does not appear to be a direct correlation. Table 7 and FIG. 24 is a table and graph showing the predicted liquid phase pressure drops versus quality calculated using an analytical model and the experimentally measured values. In FIG. 24, a linear change in liquid pressure drop versus quality, in triangles, which is expected for laminar flow is predicted by the model. The experimentally measured value is reasonably close to the predicted at 0% quality, but at all higher qualities, the measured values are steady at approximately 2 PSID which does not match the analytical model. The measured liquid pressure drop should decrease with increasing quality as the flow rate of liquid through the media decreases. It may be an instrumentation problem or possibly be a venturi effect with the high velocity gas passing through the separator, creating a lower pressure, which affected the liquid pressure drop readings. Another issue may be that water generally does not wet stainless steel well and trapped air within the porous media may be restricting the flow and creating the higher than predicted pressure drops.

TABLE 7

Design C - Liquid DP Data:
Liquid Phase dP

| Quality (%) | Model (psid) | Actual (psid) |
|---|---|---|
| 50 | 0.204 | 2.18 |
| 40 | 0.245 | 1.73 |
| 30 | 0.285 | 2 |
| 20 | 0.326 | 2.02 |
| 10 | 0.367 | 2 |
| 0 | 0.407 | 0.13 |

Conclusions and Recommendations

The work with the PoP prototypes has shown that using inertial energy with the exemplary porous media is a viable option for achieving liquid/gas phase separations. It should also be recognized that limited work has been performed to optimize the separation performance of these two designs and that additional work can be performed to improve their performance before moving on to evaluations using refrigerant fluids. Continued testing with surrogate fluids for optimizing these designs will be significantly cheaper and can be performed in a much shorter time than trying to optimize performance levels using ammonia or other refrigerants.

Although Design A outperformed Design C in terms of liquid capture efficiency, it is of note that Design A may have some limitations related to its orientation. When operating in environments where gravity forces are prevalent, Design A generally should be oriented with the liquid outlet downwards for correct operation. This means for stationary ground-based applications Design A should work well. For flight platform applications, Design A may not perform as designed, in certain embodiments. Furthermore, Design A should work in a microgravity situation as these kinds of designs have been previously shown to work in other applications. When one looks at Design C, this design does not have any known limitations of its orientation and is expected to work in any orientation where gravity is present including microgravity environments. For this reason alone, further optimization work to improve the liquid capture efficiency should be performed before final design selection is performed.

Run for Record for Proof of Principle Phase Separators

The following is the Run for Record (R4R) testing procedure of the phase one proof of principle (POP) designs for liquid/vapor phase separators (e.g., to be employed in a LASER cooling application). During R4R testing all adjustable parameters (hardware dimensions, device orientation, etc.) will not be altered for the duration of the testing and data collection for each of the three designs.

The following Table 8 is the calculated water and air volumetric flow rates to achieve the indicated quality levels. These values represent 1.25% and 2.5% by volume and 0.25% and 0.5% of the full scale total mass flow with the system running R717. Prior to the actual run for record, the choice of operating in the low or high flow range was selected based on lab scale prototype size and preliminary testing for each design. Efforts were made to target one of these two flow ranges, should any of the designs require a different flow rate to operate properly, the water and flow rates for each quality level can be recalculated for those cases.

TABLE 8

Water and Air flows equivalent to 0.25% and 0.5% of
Full Scale Separator Running R717 Versus Quality

| | Low Flow (0.25% scale by mass) (1.25% by volume) | | High Flow (0.5% scale by mass) (2.5% by volume) | |
|---|---|---|---|---|
| Quality | A. Water Flow (ml/min) | B. Air Flow (SLM) | A. Water Flow (ml/min) | B. Air Flow (SLM) |
| 50% | 100 | 79.5 | 200 | 157 |
| 40% | 120 | 63 | 240 | 126 |
| 30% | 140 | 47 | 280 | 94 |
| 20% | 160 | 31.5 | 320 | 63 |
| 10% | 180 | 16 | 360 | 32 |
| 0% | 200 | 0 | 400 | 0 |

Measurements:

The following ports, if applicable for each design, were installed to monitor pressures, temperature, and relative humidity: Pressure at the two-phase inlet; Pressure at the gas outlet (before back pressure regulator if employed to optimize performance); Pressure at the liquid outlet (before back pressure regulator if employed to optimize performance); Liquid pressure drop across porous media (only on design A); Barometric pressure at time of test; Temperature of the gas at the outlet; Relative humidity of air at outlet; Liquid flow out; Flow rate at gas outlet; a capped vessel was used to collect the liquid outlet and a rotameter on the vent to measure air flow rate; and a water droplet trap was employed on the gas outlet port to measure the air and water flows separately.

TABLE 9

Equipment:

| Model/Description | Location/Function |
|---|---|
| Sierra M100 Mass Flow (200 SLM max) | Gas Flow at Phase Separator Inlet |
| Matheson FM1050 Flow Meter | Liquid Flow at Phase Separator Inlet |
| Heise PM Digital Manometer (100 psi max) | Pressure at Phase Separator Inlet |

TABLE 9-continued

Equipment:

| Model/Description | Location/Function |
| --- | --- |
| Heise PM Digital Manometer (25 psia max) | Measures Room Barometric Pressure |
| Heise PM Digital Manometer (100 psi max) | Pressure at Phase Separator Gas Outlet |
| Meriam 2100 Smart Gage (20 psi max) | Pressure a Phase Separator Liquid Outlet |
| Meriam M2 Smart Gage (20 psi max) | Differential Liquid Pressure Across Porous Media |
| Sierra TopTrak 8225 Mass Flow (200 SLM max) | Mass flow at Gas exit port |
| Scientech SL400 (400 gram max) | Digital scale to record liquid mass flow |
| Omega TX82B (0 to 100% RH) | Relative Humidity at Gas Outlet |
| Control Company Digital Stop Watch | Timer Watch used to measure liquid flow |

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments. A "combination thereof" is open and includes any combination comprising at least one of the listed components or properties optionally together with a like or equivalent component or property not listed.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Although the systems and methods of the present disclosure have been described with reference to exemplary embodiments thereof, the present disclosure is not limited to such exemplary embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed is:

1. A phase separator device comprising:
a housing that extends from a first end to a second end, the housing having one or more first openings for the exit of a first phase output and one or more second openings for the exit of a second phase output;
swirl vanes disposed in the housing;
wherein the housing includes an axial flow cyclonic separation section and a porous media section; and
a liquid collection section in the housing; and
wherein the porous media section is a barrier and physically supports a horizontal layer of liquid accumulation of the liquid collection section horizontally on top of the porous media section, the horizontal layer of liquid accumulation of the liquid collection section perpendicular to flow of the second phase output;
wherein the axial flow cyclonic separation section and the porous media section are configured and dimensioned to separate an input feed introduced to the housing into the first phase output and the second phase output;
wherein a pressure drop across the horizontal layer of liquid accumulation and the porous media section prevents the flow of a lower density fluid of the input feed into the one or more first openings as a pressure drop of the one or more second openings is lower than the pressure drop across the horizontal layer of liquid accumulation;
wherein the porous media section is a porous membrane.

2. The phase separator device of claim 1, wherein the first phase output includes liquid, and the second phase output includes gas.

3. The phase separator device of claim 1, wherein the input feed is a fluid mixture.

4. The phase separator device of claim 1, wherein the input feed includes liquid and gases of two different constituents.

5. The phase separator device of claim 1, wherein the input feed includes liquid and vapor phases of a same constituent.

6. The phase separator device of claim 1, wherein the input feed introduced to the housing includes ammonia.

7. The phase separator device of claim 1, wherein the input feed introduced to the housing includes water and air.

8. The phase separator device of claim 1, wherein the porous media section is fabricated from at least one of porous metal, polymeric membranes, foams, fibrous materials, polymers, ceramics, or glass.

9. A phase separator device comprising:
- extractor elements disposed in a housing, the housing having an inlet for an input feed and a first outlet for a first phase output and a second outlet for a second phase output;
- wherein each extractor element includes a threaded rod housed in a porous media tube, the threaded rod defining a spiral flow path along the threaded rod, and the porous media tube extending along and housing the entire length of the threaded rod;
- wherein the one or more extractor elements are configured and dimensioned to separate the input feed introduced to the inlet into the first phase output and the second phase output;
- wherein the input feed follows the spiral flow path of the threaded rod, and inertial energy of flow of the input feed through the spiral flow path provides that: (i) a denser fluid of the input feed moves radially outwards and into contact with the porous media tube and through the porous media tube to the first outlet for the first phase output, and (ii) a lower density fluid of the input feed moves an entire length of the spiral flow path and towards the second outlet for the second phase output;
- wherein the first phase output is liquid, and the second phase output is gas; and
- wherein a mean pore size of the porous media tube is from 0.1 microns to 100 microns;
- wherein the porous media tube is a membrane.

10. A phase separator device comprising:
- a housing that extends from a first end to a second end, the housing having one or more first openings for the exit of a first phase output and one or more second openings for the exit of a second phase output;
- swirl vanes disposed in the housing;
- wherein the housing includes a reverse flow cyclonic separation section and a porous media section; and
- a liquid collection section in the housing;
- wherein the porous media section is a barrier and physically supports a horizontal layer of liquid accumulation of the liquid collection section horizontally on top of the porous media section, the horizontal layer of liquid accumulation of the liquid collection section perpendicular to flow of the second phase output; and
- wherein the reverse flow cyclonic separation section and the porous media section are configured and dimensioned to separate an input feed introduced to the housing into the first phase output and the second phase output;
- wherein a pressure drop across the horizontal layer of liquid accumulation and the porous media section prevents the flow of a lower density fluid of the input feed into the one or more first openings as a pressure drop of the one or more second openings is lower than the pressure drop across the horizontal layer of liquid accumulation;
- wherein the porous media section is a porous membrane.

11. The phase separator device of claim 10, wherein the first phase output includes liquid, and the second phase output includes gas.

12. The phase separator device of claim 10, wherein the input feed is a fluid mixture.

13. The phase separator device of claim 10, wherein the input feed includes liquid and gases of two different constituents.

14. The phase separator device of claim 10, wherein the input feed includes liquid and vapor phases of a same constituent.

15. The phase separator device of claim 10, wherein the input feed introduced to the housing includes ammonia.

16. The phase separator device of claim 10, wherein the input feed introduced to the housing includes water and air.

17. The phase separator device of claim 10, wherein the porous media section is fabricated from at least one of porous metal, polymeric membranes, foams, fibrous materials, polymers, ceramics, or glass.

18. The phase separator device of claim 10, wherein the porous media section horizontally extends across an entire width or diameter of the housing.

* * * * *